Oct. 30, 1962  R. E. CORRIGAN ET AL  3,060,795
APPARATUS FOR PRODUCING VISUAL STIMULATION
Filed May 7, 1958  11 Sheets-Sheet 1

INVENTORS
ROBERT E. CORRIGAN
HAL C. BECKER

BY *Cushman Darby & Cushman*
ATTORNEYS

Oct. 30, 1962 R. E. CORRIGAN ET AL 3,060,795
APPARATUS FOR PRODUCING VISUAL STIMULATION
Filed May 7, 1958 11 Sheets-Sheet 2

INVENTORS
ROBERT E. CORRIGAN
HAL C. BECKER

BY Cushman Darby & Cushman
ATTORNEYS

Oct. 30, 1962  R. E. CORRIGAN ET AL  3,060,795
APPARATUS FOR PRODUCING VISUAL STIMULATION
Filed May 7, 1958  11 Sheets—Sheet 3

INVENTORS
ROBERT E. CORRIGAN
HAL C. BECKER

BY *Cushman Darby & Cushman*
ATTORNEYS

Oct. 30, 1962 R. E. CORRIGAN ET AL 3,060,795
APPARATUS FOR PRODUCING VISUAL STIMULATION
Filed May 7, 1958 11 Sheets-Sheet 4

INVENTORS
ROBERT E. CORRIGAN
HAL C. BECKER

BY *Cushman Darby & Cushman*
ATTORNEYS

INVENTORS
ROBERT E. CORRIGAN
HAL C. BECKER

BY Cushman, Darby & Cushman
ATTORNEYS

Oct. 30, 1962  R. E. CORRIGAN ET AL  3,060,795
APPARATUS FOR PRODUCING VISUAL STIMULATION
Filed May 7, 1958  11 Sheets-Sheet 6
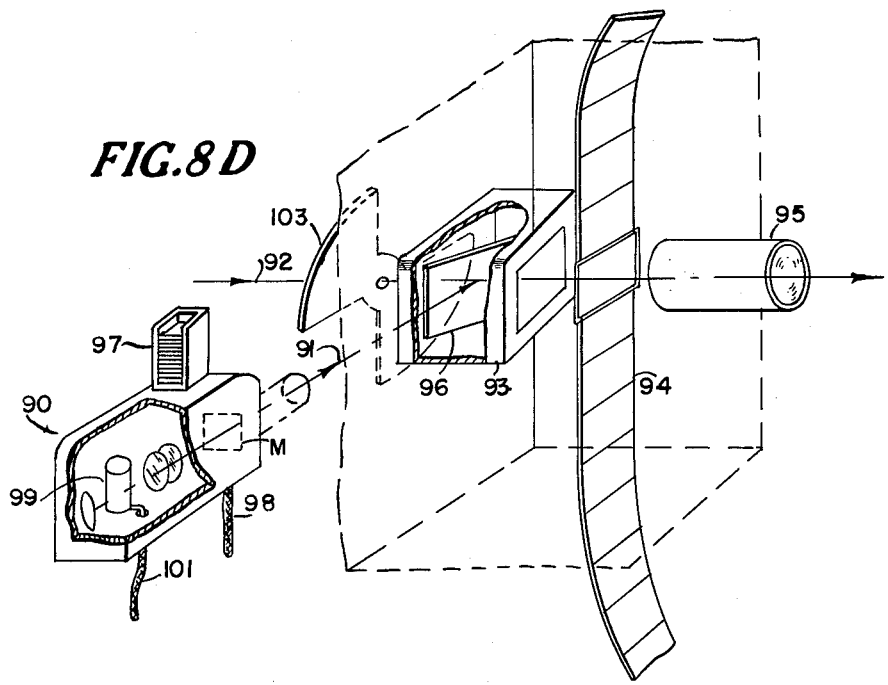
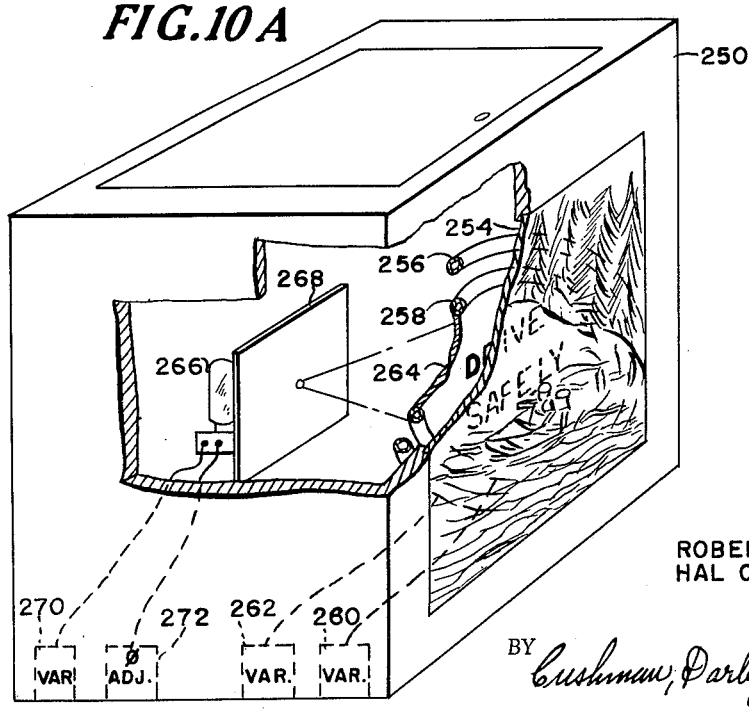
INVENTORS
ROBERT E. CORRIGAN
HAL C. BECKER
BY Cushman, Darby & Cushman
ATTORNEYS

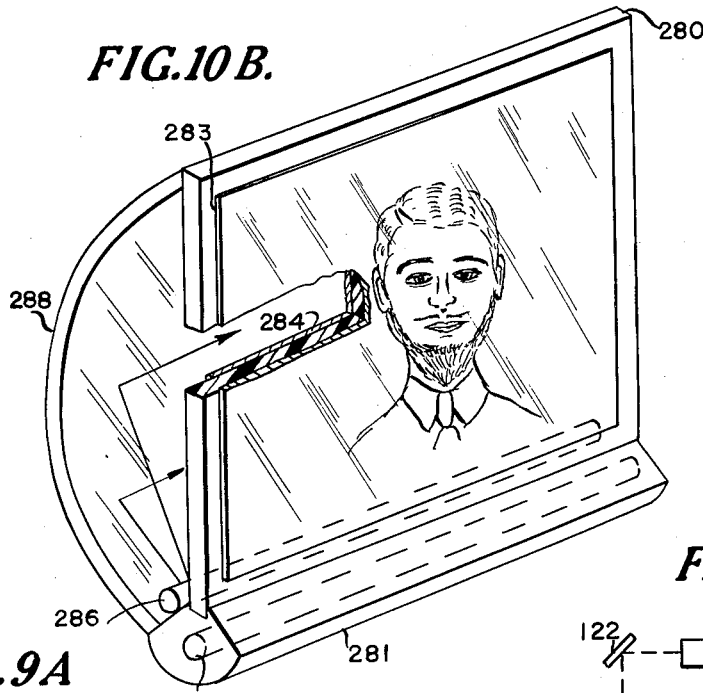
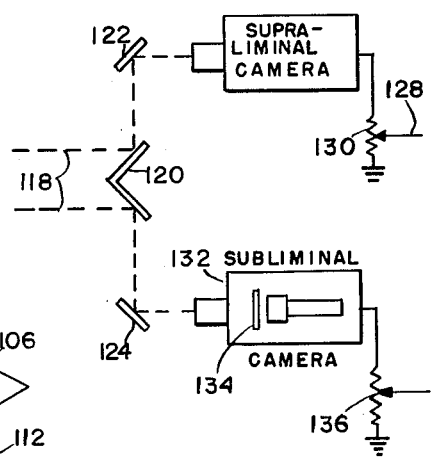
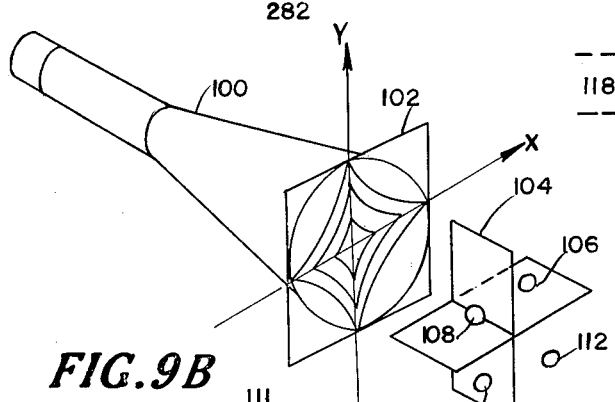
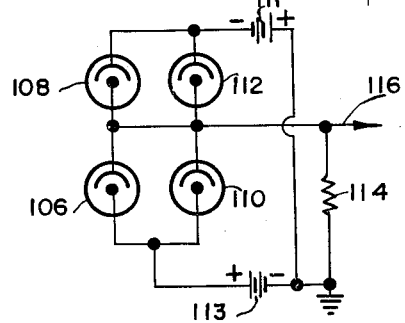

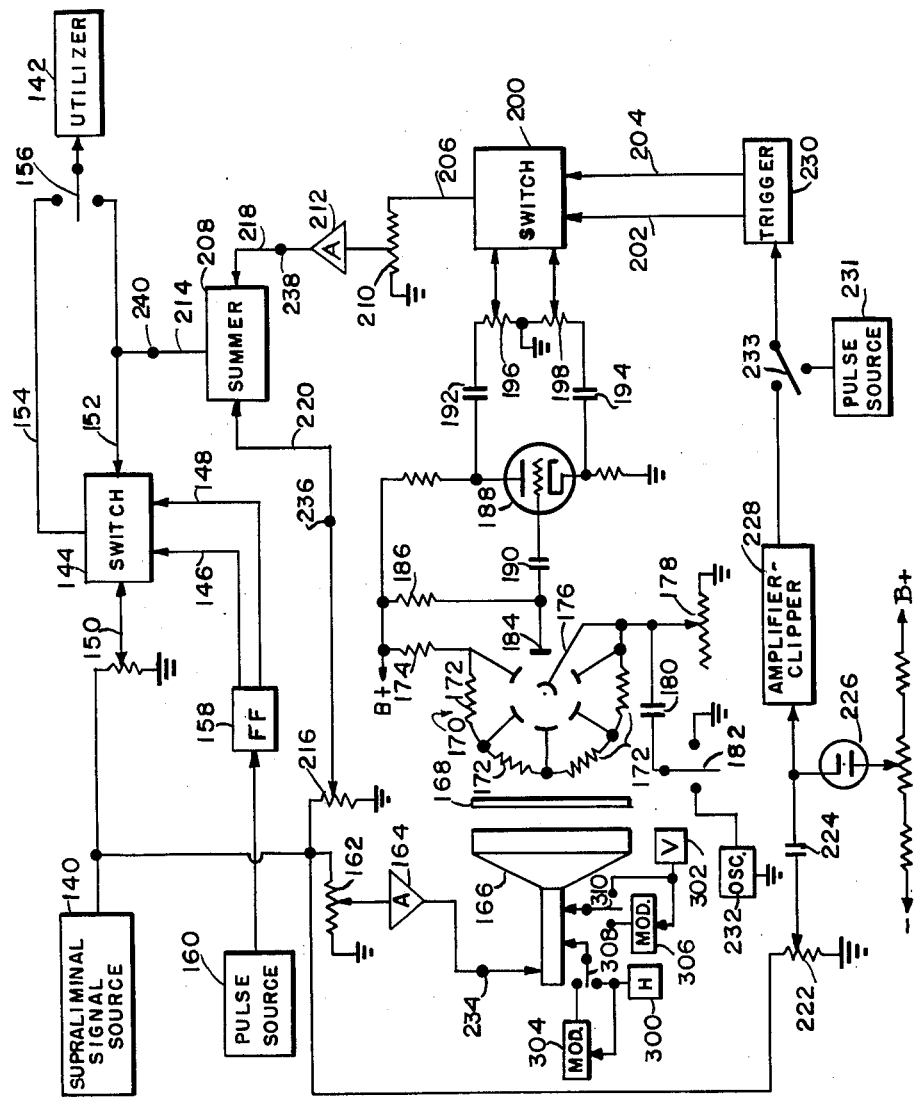

Oct. 30, 1962   R. E. CORRIGAN ET AL   3,060,795
APPARATUS FOR PRODUCING VISUAL STIMULATION
Filed May 7, 1958                       11 Sheets-Sheet 10
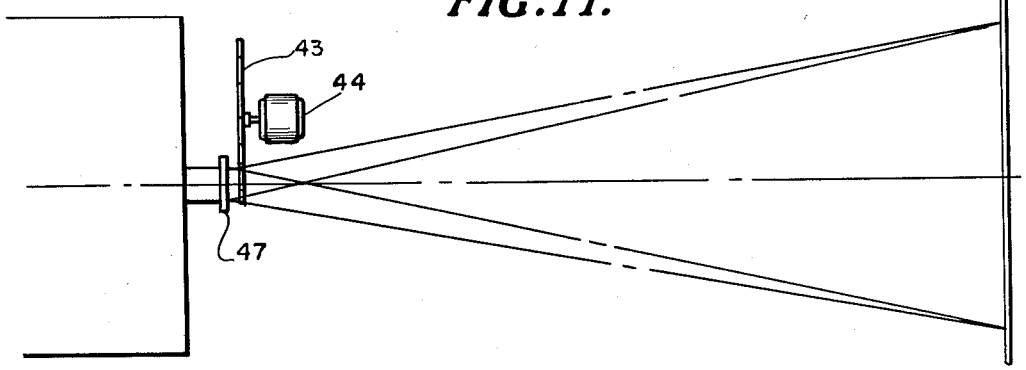
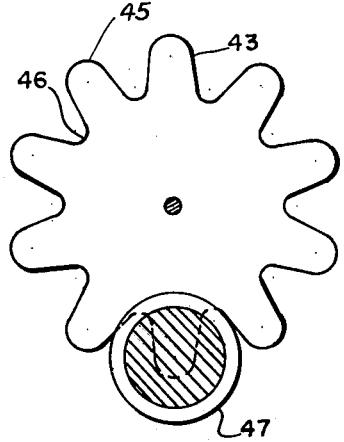
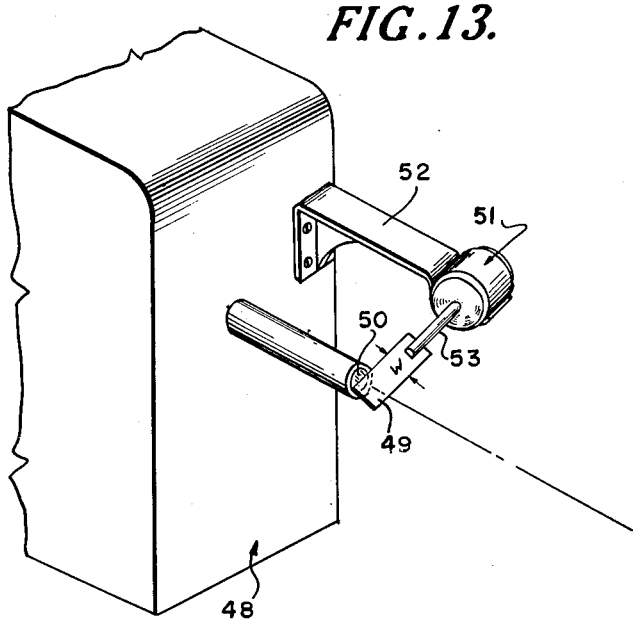
INVENTORS
ROBERT E. CORRIGAN
HAL C. BECKER
BY *Cushman Darby & Cushman*
ATTORNEYS Oct. 30, 1962  R. E. CORRIGAN ET AL  3,060,795
APPARATUS FOR PRODUCING VISUAL STIMULATION
Filed May 7, 1958  11 Sheets-Sheet 11

INVENTORS
ROBERT E. CORRIGAN
HAL C. BECKER
BY Cushman, Darby & Cushman
ATTORNEYS

United States Patent Office 3,060,795
Patented Oct. 30, 1962

3,060,795
APPARATUS FOR PRODUCING VISUAL STIMULATION
Robert E. Corrigan, Garden Grove, Calif., and Hal C. Becker, New Orleans, La., assignors to Precon Process and Equipment Corporation, New Orleans, La., a corporation of Louisiana
Filed May 7, 1958, Ser. No. 733,713
3 Claims. (Cl. 88—16.6)

The present invention relates to apparatus for producing visual stimulation at levels of awareness below that ability of an observer to report the stimulus verbally. More particularly, the present invention relates to apparatus for imparting useful information to an observer by subconscious stimulation and subsequently resulting in conscious purposive behavior of said observer without his awareness of the basis for such behavior, said apparatus comprising means for stimulating said observer below his conscious recognition level without said observer being consciously aware of any change in his environmental and physical status to impart information to said observer at said subconscious recognition level and said observer subsequently utilizing said information at the conscious recognition level.

No efforts have heretofore been directed to imparting useful information to an individual by stimulation solely below the conscious recognition level, i.e., prior to the individual's ability to verbally report stimuli. Prior workers in the general field utilized subconscious stimulation only preliminarily and always continued through to conscious recognition, thus positively changing the environmental and physical status of the individual upon whom the process was being applied.

Contrary to the above, the present invention depends upon the proved fact that humans are endowed with at least two levels of response, (1) the nonverbally reportable levels of awareness that establish that point at which stimuli will be verbally reportable, and (2) conscious awareness, i.e., the ability to report verbally the world around us.

A great amount of experimental work has been conducted in order to conclusively establish the fact that the foregoing two levels of response do exist. In carrying out these experiments, various types of apparatus as well as various media of application, were used. For example, the experiments can be carried out by means of the tachistoscope, television, motion pictures, magic lantern devices, controlled flash procedures used with signs, controlled temporal increase and decrease of brilliance of a sign, and/or combinations of the foregoing with appropriate auditory stimulation, e.g., radio, telephone and phonograph.

The above noted media can be used in various fields of endeavor. As will be appreciated from a more complete consideration of the invention, among the fields to which the said invention is best applied, are (1) medicine, phychiatry and psychology (as a diagnostic and therapeutic tool); (2) education (as an aid in teaching at all levels and, in particular, as a rehabilitative auxiliary in, for example, juvenile delinquency); (3) advertising and marketing (as point of sale advertising technique and as mass advertising process); (4) propaganda and psychological warfare (conditioning civilian and military personnel, enemy aliens, prisoners of war, or opposing forces or civilian population) and to counter "brainwashing"; and (5) enhancement of motion pictures.

Our invention is particularly applicable to motion picture and television presentation. In this regard, it can be appreciated that the average individual is far more likely to come into contact with such media in the course of his everyday life. Accordingly, the apparatus utilized by us in practicing our invention has been primarily concerned with the motion picture and television field.

With the above in mind, the principal object of the present invention is to provide apparatus for the production of visual stimulation at levels of awareness below that ability of an observer to report the stimulus verbally, in order to induce selective perception resulting in selective overt response.

A more specific object of the invention is to provide apparatus for imparting useful information to an observer by subconscious stimulation and subsequently resulting in conscious purposive behavior of said observer without his awareness of the basis for such behavior, said apparatus comprising means for stimulating said observer below his conscious recognition level without said observer being consciously aware of any change in his environment and physical status to impart information to said observer at his subconscious recognition level and said observer subsequently utilizing said information at the conscious recognition level.

A further object of the invention is to provide means as described heretofore whereby information is projected on a screen at such a temporal speed and/or light intensity as to make the image of this information imperceptible to the human eye, but, nevertheless, perceptible to the subconscious level of awareness, i.e., subliminal, and thereafter utilizing this information at the conscious recognition level of the human mind.

Another object of this invention is to provide means for imparting useful information to an observer by subconscious stimulation, said observer subsequently using the said information, said means comprising means for stimulating said observer below his conscious recognition level without said observer being consciously aware of any change in his environment and physical status to impart information to said observer at his subconscious recognition level, coincidentally (i.e., continuously or in an interleaved fashion) imparting consciously recognizable information to said observer, and said observer thereafter utilizing the subconsciously presented information at the conscious recognition level.

An additional object of this invention is to provide means for producing a subconscious response in a human being, said response being later utilized in the conscious recognition level of said human being, said means comprising at least one motion picture projector adapted to project both subliminal and supraliminal (consciously recognizable) information on a motion picture screen at predetermined levels of frequency presentation and light intensity.

Still further objects and the entire scope of applicability of the present invention will become apparent from the detailed description given hereinafter. It should be understood, however, that the detailed description and specific examples, while indicating the preferred embodiments of the invention, are given by way of illustration only, since various changes and modifications within the spirit and scope of the invention will become apparent to those skilled in the art from this detailed description.

Reference is made to the accompanying drawings wherein:

FIGURE 8D illustrates a modification of a standard motion picture projector by attachment of a slide projector;

FIGURE 9A illustrates a beam deflection hyperbolic mask type of analog multiplier;

FIGURE 9B shows circuitry for the photoelectric cells used with the apparatus of FIGURE 9A;

FIGURE 9C illustrates another type of analog multiplier;

FIGURE 9D shows still another type of analog multiplier and circuitry for applying this invention to either audio or video transmitting or receiving systems;

FIGURES 10A and 10B are other embodiments of stationary apparatus embodying this invention;

FIGURE 11 is a top plan view illustrating one embodiment of apparatus for applying the alpha rhythm frequency concept to this invention;

FIGURE 12 is an elevational view of a rotating disc for use in the apparatus of FIGURE 11;

FIGURE 13 is a perspective view of another embodiment of alpha rhythm apparatus.

Figure 1:
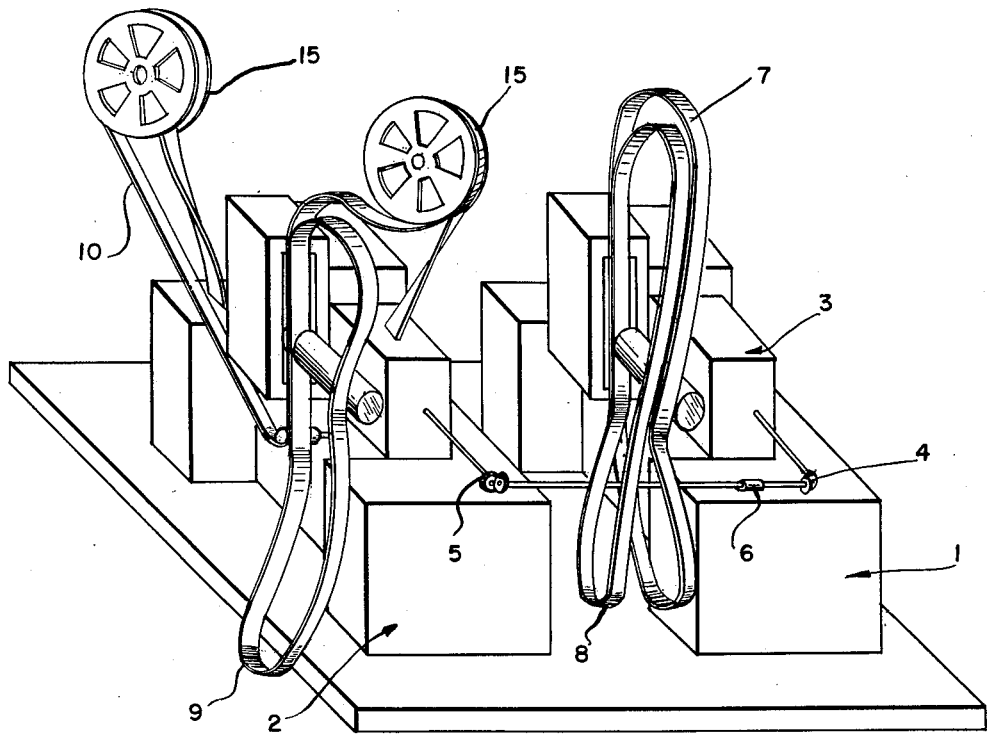
FIGURE 1 is a perspective view of a two-projector modification of the invention.

This invention basically involves the following sequence. Visual and/or auditory subject matter is presented to an individual at the non-verbally reportable levels of awareness, i.e., at that point at which only subconscious realization occurs. As noted heretofore, this subconscious visual or auditory presentation can be carried out in a number of ways and is always carried out without said individual being consciously aware of any change in his environmental and physical status.

Generally speaking, visual stimulation may be carried out by flashing the subliminal subject matter within the vision of the individual involved, but at such temporal duration, repetition rate, and/or light intensity as to make the subject matter imperceptible to the conscious level of awareness of said individual. Rather than intermittently flashing the subliminal subject matter, continuous temporal non-discrete presentation can be used as will be detailed hereinafter.

With respect to auditory stimulation, the presentation of sound frequencies continuously or at extremely brief duration times with low sound intensity levels may be utilized. As can be appreciated, the subject matter is presented in this way in order to penetrate the subconscious awareness of the individual by way of auditory response.

In order to properly determine the fact that a subconscious level of perception exists, and to evaluate results obtained, a series of experiments were conducted wherein individuals were subjected to certain tests investigating the reliability and validity of selected visual, verbal and motor responses as indicators of personal values in perception. Three experimental procedures were used, namely: (a) the word association technique, (b) the tachistoscopic technique, and (c) the Luria motor technique.

Subjects were practiced to respond with a preferred hand by voluntary depression of a key depressor simultaneously with their verbal response in the word association and the tachistoscopic technique. Graphic tracings were recorded and analyzed into four distinct indices measuring motor response between the application of the stimulus matter, either visual or auditory, and the point of completion of key depressing activity by the preferred hand.

The words presented in the word association and tachistoscopic technique were identical. Three categories of words were used as the subject matter and represented three degrees of increased judged emotional implications. The individuals utilized were drawn from various fields of study and were tested both with pre-knowledge of the words used and without pre-knowledge thereof.

For the tachistoscopic phase the subjects were initially presented the stimulus words at a point below the main conscious level for words of little or no emotional implication. Tachistoscopic presentations were then made in constant time increments for all categories of stimulus words and for all individuals, up to the point of correct response.

As a result of experiments as outlined heretofore, it was established that individuals were influenced in significantly greater amounts the further the distance from conscious awareness. Further, it was shown that individuals selectively respond to stimulus words of increased judged emotion (such as "rape" as compared to "water"), prior to their ability to report orally the correct stimulus word, i.e., at a subconscious recognition level of awareness. These tests strongly evidenced the fact that a subconscious recognition cognitive process including discrimination, evaluation, integration and organization, actually does occur at such recognition levels. Such cognitive process is believed to operate prior to one's ability to consciously report the most neutral of visual stimuli and is the basis for our novel process and apparatus, to wit, the utilization of subconscious recognition levels of awareness to influence subsequent conscious behavior.

In line with the above, other experiments were conducted, as for example, conditioning neutral word stimuli with palmar shock at levels of awareness below the ability to correctly report the presented stimulus word. The results of such further experiments corroborate the experiments described heretofore.

Based on the conclusions noted heretofore, it has been proved that individuals perceive at non-reportable levels of awareness. With this in mind, the process and apparatus of this invention were developed to impart information to individuals at the subconscious level, such information subsequently being utilized at a conscious level.

As an example, subjects were presented problems to solve in three separate steps under conditions such that half of these subjects (the experimental group) were presented the solutions to the problems at the subconscious level of recognition, and the other half of the subjects (the control group) were presented a series of XXXXX's at the subconscious level of recognition. The times required for problem solution by subjects in the experimental and control groups were recorded. Problem solution times required by subjects in the experimental group (those who were presented the solution subliminally) were significantly shorter (shorter by 50%) than the solution times required by the subjects of the control group who were presented meaningless material subliminally (i.e., presented the series of XXXXX's subliminally).

A part of this invention is the discovery that the environmental conditions surrounding the presentation of the subliminal and supraliminal material to the subject have an effect on the results obtained. One aspect of this point involves the fact that the character of the supraliminal material many times affects the receptivity at a subconscious level of recognition of the subliminally presented material. Thus, if the subject favorably reacts to the consciously presented material, many times he is more likely to be more receptive to the subliminal material being coincidentally presented. On the other hand, if the consciously presented material is not liked by the observer, then the subliminal material is statistically less readily received.

Conversely, the character of the subliminal material affects the receptivity of the supraliminal material. If the subject subconsciously favorably reacts to the subliminal material, he is more likely to react favorably to the supraliminally presented material. This factor is of great utility in, for example, advertising. An illustration would be the analysis of a subject as to his feelings about a certain trade mark by presenting the trade mark subliminally and ascertaining its influence on the receptivity of supraliminal material.

Along the same lines as noted heretofore, the seating position of a subject during the presentation of the subliminal and supraliminal material is important. Further, the degree of continuity in the presentation procedures and conditions, such as temperature, light, incidental distractions, e.g., insects, and the like, are factors to be considered. Of course, it can be appreciated that since both positive and negative factors are interacting simultaneously, the statistics of the system in large group presentation yield an end effect which is an average predictable result.

Before relating specific apparatus which can be used in the application of the novel method of this invention, general statements should be considered. For example, in medicine, psychiatry and psychology, process and apparatus might function as a powerful diagnostic and therapeutic tool. Using a motion picture screen upon which to project subject matter visible to the human eye and coincidentally (i.e. simultaneously or in interleaved fashion) projecting additional subject matter of a predetermined type, upon the same screen at such a shutter speed and light intensity as to make the image of this latter information unrecognizable at a conscious level, represents many possible utilities. Though the latter information is consciously imperceptible, it is, nevertheless, perceptible to the subconscious level of awareness. Thus, an individual suffering from a conscious mental block can be aided in overcoming such mental block by stimulation of his subconscious level of perceptibility with information that the individual would normally reject at a conscious level of perceptibility.

In education, this invention can be similarly utilized. Particularly, we have in mind the current problems faced by teachers involving juvenile delinquents and the latter's rejection of sincere efforts to impart knowledge to them. By utilizing, for example, the above described motion picture method, such delinquents can actually be imparted information of a cultural nature through their subconscious perceptibility and yet by holding their attention through a presentation of a motion picture appealing to their conscious level of perceptibility.

Advertising and marketing is a further immense field for utilization of this invention. For example, both by means of sign boards, television and motion pictures, and on an auditory level by means of radio or the sound channel in television systems for example, advertising slogans and/or symbols can be presented to the subconscious level of perception of the potential consumer, whereas such presentation would many times be rejected if presented to the said consumer at a conscious level of awareness.

Particular apparatus and technique generally applicable to both single projector and dual projectors are illustrated in FIGURES 1 to 5 and are described hereinafter. Standard motion picture projectors can be utilized in the development.

One way to utilize the characteristics of a single standard projector in order to present subliminal stimulus material at the subconscious level of recognition, intermixed with the supraliminal material contained in a conventional motion picture film, is to insert the stimulus material into the motion picture film continuously, aperiodically, or periodically as for example, one frame out of, perhaps, every twenty-four frames. Another way is to reprint the entire motion picture film while inserting the stimulus material into the desired frames by some suitable modification of the printing process. For example, and in accordance with this invention, a master negative film from which the distributors' positive films may be made, may be the resultant film produced by modulating light, before or after it passes through a positive film containing the supraliminal scenes, with the subliminal information (frame for frame or at any other desired periodic or aperiodic rate) as present in the form of images on an underexposed postive print. That is, for example, to make a new negative of the already extant motion picture film so as to have the new negative include subliminal information in the frames desired, light may be shown by a step-printer serially through a stationary frame containing an underexposed positive image of the subliminal information, or through an ending or endless underexposed positive film in which all or any part of the frames contain the subliminal information as images with the remainder being clear frames, and thence through the original positive of the supraliminal film. The light output from the supraliminal film exposes another film strip, the master negative. With all the films run in frame synchronization during the reprint process, the finished master negative contains essentially two latent images, one being the image of the original supraliminal material and the other being the subliminal material as optically multiplied by the supraliminal information. Development and printing of such a master negative provides a film (print) which may be shown by a single standard projector.

These methods are rather expensive, particularly when the process just described is divided into a multistage operation to provide more accurate control of exposures, and when an additional stage is utilized to provide a constant (or base) exposure of the subliminal information in addition to the multiplied (or proportional) exposure achieved as described above (by passing light simultaneously through the filmed subliminal information and the filmed supraliminal motion picture). This additional base exposure is desirable when alternating positive and negative subliminal frames are not used, since it achieves two very desirable ends: (1) it permits effective subliminal communication in the very dark areas of the picture which would not be allowed by the proportional modulation alone, and (2) it can be controlled in such a way as to compensate for certain known deviations in the Weber fraction $$\left(\frac{\Delta I}{I}\right)$$

Utilization of alternating positive and negative subliminal images may reduce the multiple stage insertion process to an efficient single-stage operation when proper exposure parameters are used.

Reference to other less expensive ways for utilizing a single projector will be described hereinafter. Still other less inexpensive means are embodied in the following two projector technique involving apparatus constructed in accordance with this invention. Of course, this two projector technique is equally applicable to still projectors of the magic lantern type as will be noted hereinafter in connection with FIGURE 14.

Figure 2:
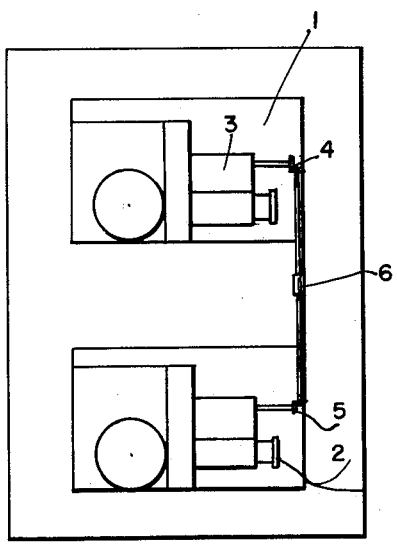
FIGURE 2 is a top plan view of two synchronized projectors.

Two projectors are illustrated in FIGURE 1. Projector 1 is synchronized with projector 2 as shown in FIGURE 2, and further aligned so that the optical axes are positioned to cause the images projected by each to coincide on a viewing screen (not shown). As shown projector 1 is used for projection of subliminal material and projector 2 is utilized for the projection of supraliminal material, such as a movie, for example, in the form of the cartoon "Woody Woodpecker."

Referring to FIGURE 2, it will be noted that projectors 1 and 2 respectively contain drive motors (generally illustrated by reference numerals 3 and 3′) and are synchronized by means of the right angle bevel gears 4 and 5 and the universal joint 6. In order to render the effects of gear back lash negligible in the mechanical synchronization of the two projectors, the drive motor 3′ is adjusted to run at a slightly lower speed than that of following projector 1, when uncoupled. Therefore, upon coupling, the projector which tends to run at the higher speed supplies enough torque through the mechanical linkage to stabilize the gear back lash.

The supra and subliminal film arrangement noted above is shown in FIGURE 1. In this arrangement, endless loop 7 contains in each matrix or frame thereof the stimulus material to be presented subliminally, while the endless loop 8, which runs through the projector mechanism synchronously with loop 7, functions as a blanking loop as indicated by FIGURE 3.

Figure 3:
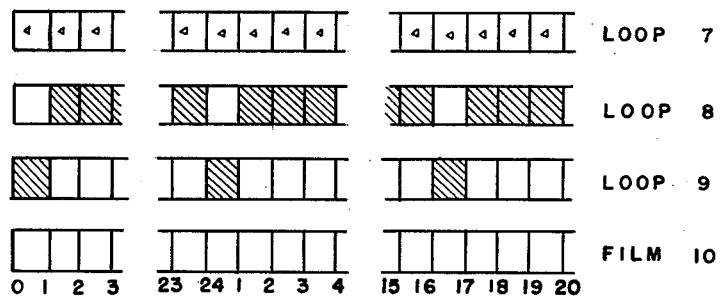
FIGURE 3 is a schematic illustration of the various loops and supraliminal film showing the respective relationships thereof.

In FIGURE 3, the heavy cross-hatched frames of loop 8 represent completely opaque frames, while the clear frames represent maximum transparency of the film. With such an arrangement, it can be appreciated that the repetition rate at which the subliminal stimulus material is presented is controlled by the characteristics of the blanking loop 8. The temporal sequence of transparent frames and opaque frames in blanking loop 8 can be periodic, e.g. once per second, aperiodic or random depending on the effect desired. In this respect, whether regular periodic presentation of the subliminal stimulus material is more desirable than a staccato random presentation, is determined by the specific circumstances of presentation. However, with the system of loops described, either method of presentation can be realized merely by proper composition of the blanking loop 8, or alternatively, loop 8 can be dispensed with so as to effect a continuous presentation of the subliminal information on loop 7.

It should be noted that an additional "blanking" loop 9, illustrated in FIGURE 1 and specifically disclosed in FIGURE 3, can be used to run synchronously with the supraliminal motion picture film 10 in projector 2. Such a loop 9 includes frames of varying opaqueness and provides one method for controlling the light intensity of the supraliminal material. This aspect of the apparatus is merely disclosed at this point with respect to the possibility of using an endless loop to control light intensity of either the supraliminal or the subliminal material, but will be fully discussed hereinafter along with other means that can be used to accomplish this purpose.

Bearing in mind that either periodic, random, or steady state presentation of subliminal stimulus material can be utilized in connection with the apparatus, there are one or more additional variables which must be controlled. These are: (1) brightness of the supraliminal material, (2) brightness of the subliminal material (3) duration of exposure of the subliminal material, and (4) choice of presenting the subliminal material either during the period in which supraliminal material is being presented, or during the blanking period of the said supraliminal material.

In connection with the first variable noted above, there was previously briefly discussed one means of controlling the brightness of the supraliminal material, such as by using an endless loop running synchronously with the supraliminal motion picture films and having frames of varying opacity. There are several additional methods by which the brightness of the supraliminal material may be controlled, such as the use of different wattage projection bulbs, a variable aperture in the optical system, a neutral filter, or means for varying the voltage applied to the projection bulb.

The brightness of the subliminal material may be similarly controlled. In this respect, a third endless loop (not illustrated) could be incorporated with loops 7 and 8, such endless loop running synchronously with the former and functioning in a manner like endless loop 9 described heretofore.

Figure 4:
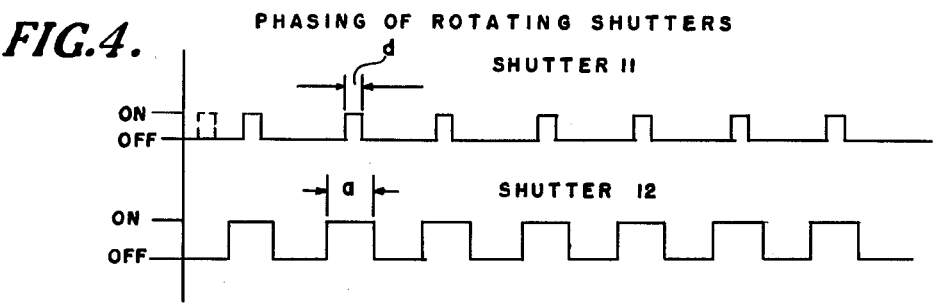
FIGURE 4 is a diagrammatic illustration of the phasing of rotating shutters.
Figure 5:
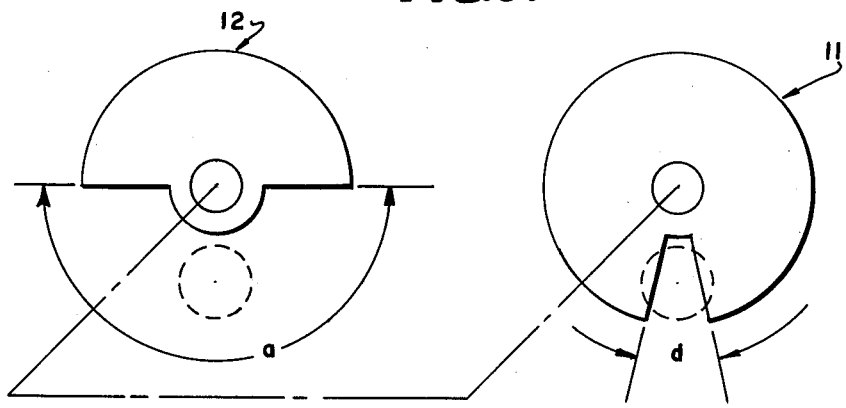
FIGURE 5 is an elevational view of shutters in the phasing positions diagrammed in FIGURE 4.

The duration of exposure of subliminal material during any given period such as a frame, for example, can be controlled by means of the shutter sector angle "d" shown in FIGURE 5 in conjunction with, or without, the blanking loop 8 of FIGURE 1. This duration is graphically illustrated in the top portion of FIGURE 4 and is a function of the shutter sector angle "d."

Referring to FIGURE 5, it can be appreciated that the choice of presenting the subliminal material during the presentation period of the supraliminal material or alternatively, during the off period of such supraliminal material, is governed by the mechanical phasing of the shutters 11 and 12 in the two projectors. By properly phasing the rotating shutters, the subliminal material can be presented during the presentation time of the supraliminal projector. This is illustrated in FIGURE 4, wherein the bottom portion graphically illustrates a constant exposure period "a" of the supraliminal material, and the solid line drawing of the top portion illustrates the presentation time "d" of the subliminal material during the said presentation time "a" of the supraliminal material. Presentation of the subliminal material during the off time of the supraliminal material projected is shown in dotted line in the top portion of FIGURE 4.

If it is desired to present the subliminal material during every frame of the supraliminal motion picture, and for a duration per frame equal to that of the motion picture, this can be accomplished by constructing the projection screen in such a way that the reflectance of the screen is previously altered by any conventional means in those areas on which the subliminal material is to appear. Thus, in order to present subliminal material, e.g. a well known trademark, as grey or relatively dark on a lighter background, the reflectance of the screen in the areas to be covered by the subliminal material would be reduced, and, conversely, for light subliminal material on a darker background the reflectance of the background would be made less than that of the areas occupied by the subliminal information. Such a screen eliminates the need for subliminal image projector 1.

Figure 1A:
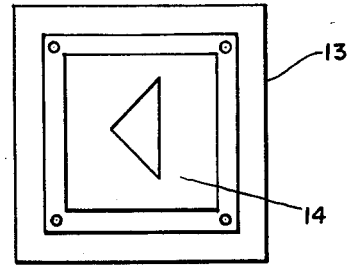
FIGURE 1A is a top plan view of a stationary frame retaining pressure plate.

In this connection, in the cases where equal durations per frame of the supraliminal motion picture and the subliminal material produce adequate effectiveness of the invention, stationary frame presentation of the subliminal material by means of projector 2 fitted with a stationary frame retaining pressure plate 13 (FIGURE 1A) and including subliminal material 14 can be accomplished by means of this projector alone, again eliminating the need for subliminal projector 1.

Of course elimination of the subliminal projector 1 can also be accomplished, when equal durations of the subliminal and supraliminal information is satisfactory, by making the endless loop 9 contain the subliminal information in each frame thereof.

With either single or dual projection systems, the presentation of the subliminal information either as light symbols on a darker background or dark symbols on a lighter background, or alternation therebetween, is within the scope of this invention. This may be easily accomplished by making some frames in an endless loop negatives and others positives in any desired aperiodic or periodic fashion, for example alternately. Alternation between positive and negative stationary frames in either a single or dual projection system may be accomplished by suitable manual and/or automatic means.

It can be appreciated that various other modifications along the same line, as noted heretofore, can be utilized and are contemplated by this invention.

In connection with the foregoing, the drawing in FIG-

URE 1 shows the endless loops diagrammatically presented without their necessary mechanical supports. Of course, such mechanical supports can be, for example, the well known film reel 15 of the standard projector as shown on projector 2.

In addition, the drawing of FIGURE 4 has been idealized by picturing rectangular pulses of light. The actual pulses are rounded on both leading and trailing edges.

Figure 6:
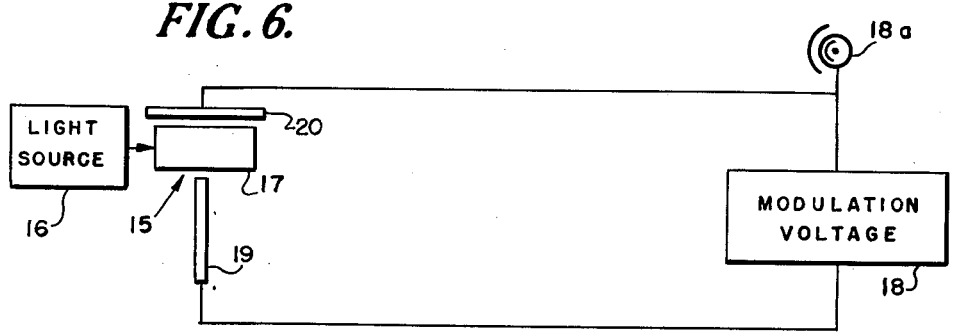
FIGURE 6 is a block diagram of a light intensity control cell.

FIGURE 6 is a specific illustration of means for controlling the second of the four variables listed heretofore, i.e., the brightness of the subliminal material. One of the factors which determines whether or not the subliminal material presented by projector 1 of FIGURE 1 remains subliminal throughout a given motion picture is the minimum brightness of any area within the motion picture itself. That is to say, the subliminal material may be completely subliminal during a given motion picture if all of the area in the motion picture film has a minimum brightness level which remains above some critical minimum level. However, if the brightness of any critical area should fall below the critical minimum brightness, this would permit the subliminal material to be perceived and recognized consciously. Thus, in any motion picture, those scenes which have minimum brightness are the ones which establish the maximum level of brightness at which the subliminal material may be presented without risking conscious recognition on the part of the viewer.

On this point there are at least two ways in which this limitation can be eliminated. One is to edit each motion picture and cut out those scenes which fall below some predetermined minimum brightness. Of course, this would be impractical in most cases.

Bearing in mind that the endless loop type of control noted heretofore is primarily designed to control the light intensity of the subliminal material per se, another more practical method for coping with the problem of variability of light intensity of motion picture scenes is to modulate the intensity of the light source in the subliminal image projector in accordance with the average brightness of the motion picture as a function of time. That is, lower brightness levels in the motion picture thereby effect proportionately lower brightness levels in the light source of the subliminal image projector.

It is obvious that a projection bulb of the incandescent type could not respond rapidly enough to the light intensity variations that would be called for by an average motion picture. Therefore, in order to satisfy the demands of proportional light intensity responses, any one of the four following arrangements, in conjunction with or without either or both the blanking loop 8 of FIGURE 1 and shutters of FIGURE 5, can be utilized:

(1) A consant intensity light source in projector 1 of FIGURE 1 plus the use of a motion picture film identical to the one in projector 2. This second motion picture film would run through projector 1 along with endless loop 7 containing the subliminal material fully described heretofore, and would be mechanically synchronized, frame for frame, with the motion picture of projector 2. This arrangement automatically provides the desired relationship between the light output of projector 2 at any point on the screen and the light output of projector 1 for the same point on the screen.

(2) A light source of constant intensity followed by a modulating light valve such as the light modulating cell illustrated in FIGURE 6.

(3) A light source of variable intensity having a time constant short enough to allow it to follow the brightness variations of the motion picture, or (4) A pulsed light source of variable or constant intensity. With this alternative, neither a blanking loop nor a rotating projector shutter is necessary for controlling the "off" and exposure times of the subliminal information since the "on" time of the subliminal light source can be synchronized with the supraliminal projector by appropriate means to obtain the desired subliminal presentation.

The light modulating cell 15 of FIGURE 6 includes a subliminal projector light source 16 of constant intensity. A light passing medium 17 such as water, glass, nitrobenzene, or quartz, for example, is positioned in front of light source 16 and is capable of variable deflection and modulation of light rays depending upon the voltage 18 applied to electrodes 19 and 20.

It can be appreciated that a photo-electric cell 18a can be used in controlling the voltage applied to the electrodes of the cell 15. This photo-electric cell operates as a sensing element to sample the motion picture frame being shown at any given time so as to suitably vary the voltage by means of standard circuits, and likewise vary the light intensity of the subliminal material. The cell may be provided with an integrating circuit so that the deflection voltage can be modulated in value depending upon the average brightness of the supraliminal material over a specified period.

In connection with this sensing element, it could also comprise a group of photo-electric cells arranged in a two-dimensional rectangular array such that each photo-electric cell samples only its own elemental area of a motion picture frame. In this way, it can be insured that the brightness of the subliminal image projector would be that called for by the particular photo-electric cell receiving the lowest level of illumination. That is, the darkest elemental area of a motion picture frame would determine the brightness of the subliminal image projector.

It should be appreciated that, rather than modulating the light intensity of the subliminal image projector in accordance with a minimum brightness level of the supraliminal motion picture projector, a simple on-off light valve could be used such as a shutter operated by a rotary or other type solenoid. The solenoid can be controlled so that if any given motion picture scene falls below a certain level of light intensity, the shutter operates to close off any further projection of subliminal material.

With respect to the relative brightness of the subliminal and the supraliminal material, ambient lighting conditions on the projector screen have a very significant effect, and the use of a device for controlling such ambient lighting conditions is a part of this invention. This device allows the subliminal material to be held at such an effective intensity that it always remains very near to the conscious perception threshold for the average individual and yet not risk conscious recognition by such individual. By controlling ambient lighting conditions, variations from the proper ratio of light intensities between the subliminal and supraliminal image projectors can be obviated.

Figure 7:
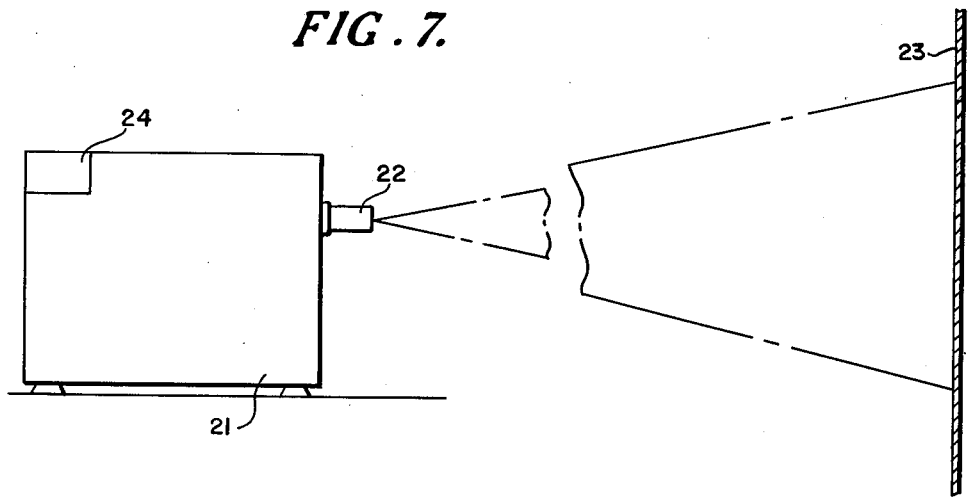
FIGURE 7 is a side elevational view showing a projector for controlling ambient lighting conditions.

Such a device is illustrated in FIGURE 7 and can consist of a standard slide projector 21 having an appropriate aperture 22 so that its projected beam illuminates the projection screen 23 upon which supraliminal and subliminal material are being projected. The light source of the slide projector is controlled by a variac 24 so that its intensity can be dynamically controlled by a trained observer sitting in the most favorable position among the individuals who are viewing the presentation. Thus, the trained observer, by controlling the intensity of the projection bulb within slide projector 21, controls the ambient lighting of the projection screen 23 upon which is being projected both the subliminal and the supraliminal material. In this way, the trained observer is able to maintain the "effective intensity" of the subliminal material at such a level that this trained observer, but not an untrained observer, is just able to perceive the said subliminal material at all times. It can be appreciated that other modifications of this device could be used to accomplish the same result and are contemplated by this invention.

Figure 8:
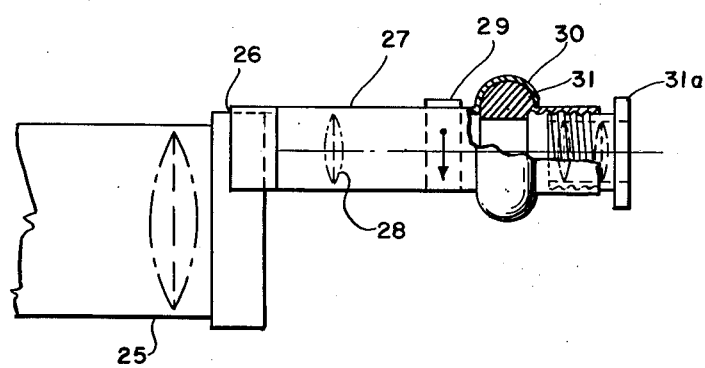
FIGURE 8 is a perspective view of one modification of an assembly for use on a single projector.

For various reasons, it might be desirable to utilize a single motion picture projector rather than any of the dual projector techniques described heretofore. Several general ways and means for using a single projector in accordance with this invention have been outlined heretofore. However, reference is now made to other embodiments of single projector systems. In FIGURE 8, there is shown an attachment on a standard motion picture projector to permit the utilization of one projector for presentation of both the subliminal and supraliminal material.

The device as shown in FIGURE 8 is constructed in such a way that it can be maintained in position in front of the projector lens 25 on the standard motion picture projector by means of clamping element 26. The barrel assembly 27 splits off a portion of the projected beam of the standard motion picture projector in order to provide the correct amount of light output from the device.

The amount of light output picked off by the attachment is that amount necessary to produce the required subliminal image on the screen. This amount of light including the supraliminal image is brought back into focus by the internal lens assembly 28 at a proper focal plane 29. It is in this focal plane for example, that the illustrated stationary subliminal frame 13 (FIGURE 1A) can be inserted perpendicular to the optical axis of the device. Of course, if endless loop presentation of the subliminal material is contemplated, and the necessary synchronized mechanical arrangements of the general type described heretofore in connection with dual projection are provided, the endless loop containing the subliminal material could run through the device at the same vertical focal plane 29 noted in FIGURE 8.

The torus-like flare 30 of the barrel houses a cylindrically symmetrical semi-toroidal ball which mates with socket 31 to effect a universal joint along the optical axis. This permits the axis of symmetry of the barrel assembly to have the necessary degree of freedom to accomplish proper registration of the subliminal and supraliminal images in conjunction with projection lens 31a.

The light rays containing the standard supraliminal motion picture material are modulated in intensity by the subliminal material contained in the stationary frame 13. These light rays containing the supraliminal and subliminal material are focused, as noted heretofore, through projector lens 31a of the device, on the projection screen (not shown in FIGURE 8).

There are, of course, many possible variations of this illustrated device. For example, mirrors or a prism assembly could be used. Likewise, various different lens combinations could be substituted for the particular type illustrated in FIGURE 8.

Figure 8A:
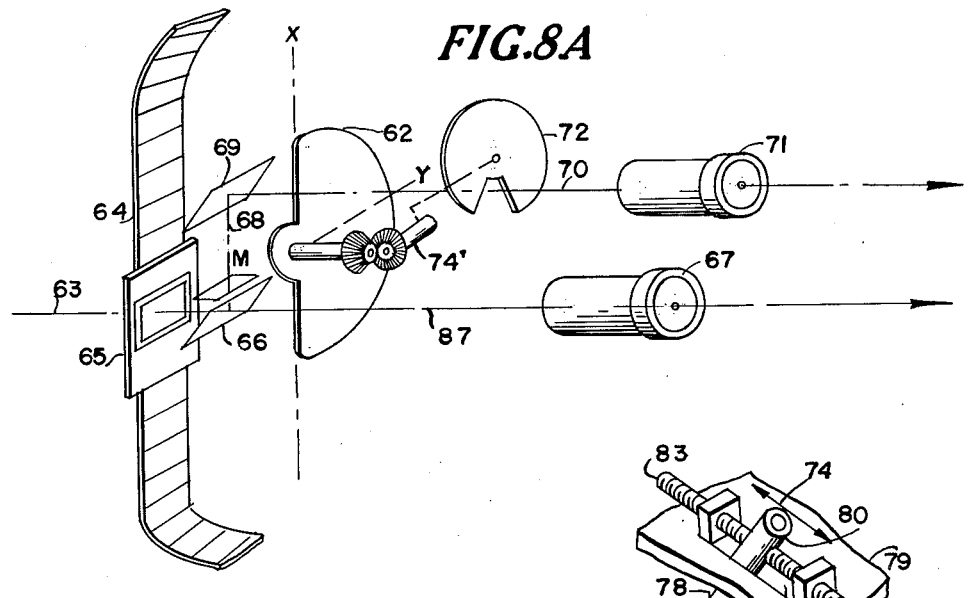
FIGURE 8A is a single projector modification employing an opaque sector.

FIGURE 8A shows another type of single projector system wherein a rotatable opaque sector 62, similar to sector 12 of FIGURE 5, may be employed to phase the light resulting from the supraliminal information with the light from the combined supraliminal and subliminal information. The supraliminal light variations resulting from light rays 63 being passed through the different frames of the conscious level motion picture film 64 threaded in a projector in the usual manner relative to pressure plate 65 pass a semi-transparent beam slitting mirror 66 to and through a conscious level projection lens 67 whereby same are focused onto a screen (not shown). Part of the light rays emanating from the film 64 are reflected upwardly along a path 68 to a mirror 69 and thence along a path 70 toward a subliminal projection lens assembly 71. A subliminal information matrix M such as a transparency or photographic film may be placed in either of the light paths 68 or 70, and as is shown, is disposed in the path 68 between mirrors 66 and 69. The light rays reaching lens assembly 71 consequently contain the subliminal information as modulated by the supraliminal information light rays, and the combination by virtue of the movability of mirror 69, as will be presently described, may be registered onto a viewing screen (not shown) along with the supraliminal light rays issuing from lens assembly 67, but at different times as desired. For causing interleaving of the supraliminally modulated subliminal light rays, the opaque sector 62 may be rotated in the X—Y plane by suitable shafts and gearing so as to intersect the supraliminal light rays passing through the semi-transparent mirror 66 at one time and so as to intersect light beam 70 at another time. Although the sector 62 is shown as comprising an angle of approximately 180°, any other suitable angle may be employed. By varying the angle of the opaque sector, alternation between the presentation of subliminal and supraliminal information may be effected, or both may be presented simultaneously for a time after which each is individually and successively presented.

If it is desired to further control the presentation duration time of the subliminal information, another shutter or moving sector 72 may be employed. As shown, this sector is disposed in the path of light rays 70, but, of course, it may be disposed in the path of light rays 68. Sector 72 may be similar to sector 11 of FIGURE 5, and may be synchronized in movement with sector 62 by connection thereof to the driving shaft 74', although such synchronization is not an essential. The angle of the cut-away portion of sector 72 determines the light angle or time duration of the presentation of the subliminal information. Thus, when both sectors 62 and 72 are employed, not only can the phasing of the subliminal and supraliminal light rays be accomplished, but also independent adjustment of the light angles or time duration presentation of the supraliminal and subliminal information can be accomplished. The use of sector 72 may also be such as to interrupt the subliminal light rays to blackout same during the interval of time in which the motion picture film 64 is advanced from one frame to the next. Employment of sector 72 for any of the foregoing purposes, however, is a modification which is not strictly essential to the operation of this invention.

Figure 8B:
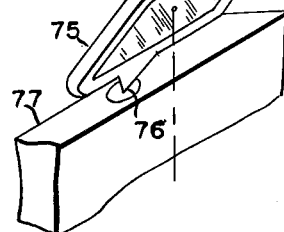
FIGURE 8B is a detail of a mirror mount for the apparatus of FIGURE 8A.

For proper adjustment of the subliminal information light rays onto a viewing screen, mirror 69 is preferably movable so as to permit two degrees or directions of freedom. This may be accomplished in many different manners, and one specific example thereof is shown in FIGURE 8B wherein the two degrees of freedom of movement are indicated by arrows 73 and 74. The mirror 69 is firmly mounted in a frame 75 at the lower end of which is a point 76 disposed in a jewel bearing supported by a structural member 77 which may be a part of the projector housing or case, for example. The upper member of the mirror frame 75 is connected to a shaft 78 which extends up through an elongated aperture or slot 81 in the mount 79, which may also be a part of the projector housing or case. On the portion of shaft 78 above the support 79 is snugly disposed a neoprene or similar type sleeve 80 which when rotated provides adjustment of the mirror in the directions indicated by arrows 73. The sleeve 80 is contacted on opposite sides by two set screws 82 and 83 by which adjustment in the direction of either of arrows 74 may be made. Of course, the set screws also operate to hold the mirror 69 secure at a desired position. Thus, it is apparent that proper spacial orientation of mirror 69 is provided by this arrangement whereby proper registration of the conscious level and preconscious level images may be projected on a single viewing screen.

Figure 8C:
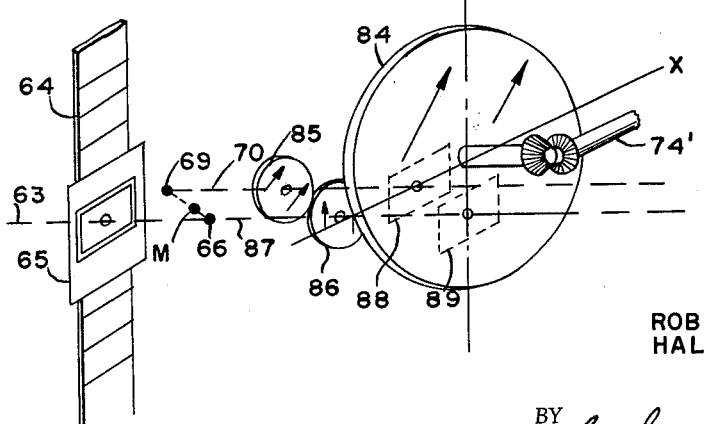
FIGURE 8C is another single projector modification of the polarizing disc type.

Instead of the rotating opaque sector type modification of a single projector, polarizing discs such as shown in FIGURE 8C may be provided to accomplish similar results. In this illustration, the semi-transparent beam splitting mirror 66, mirror 69 and the subliminal information matrix M are shown symbolically, but can be similar to those illustrated in FIGURE 8A. In this embodiment, a rotatable polarizing disc 84 with its plane of polarization indicated by solid arrows thereon, is utilized in place of the rotating sector 62 of FIGURE 8A. In addition, polarizing discs 85 and 86 are interposed perpendicularly in the optical paths defined by light rays or beams 70 and 87 respectively in such a way that the direction of polarization of each disc is adjustable. Any orientation of the discs 85 and 86 may be utilized, and for purposes of illustration the polarization orientation of disc 86 is parallel to the Y axis of disc 84, while the polarization orientation of disc 85 is approximately +45° with respect to the XY axes. Since the large polarizing disc 84 rotates by virtue of the gearing and shafts shown, its axis of polarization is continually changing, but for an instant during each of its cycles, its axis of polarization is at an angle of +45° with respect to the XY coordinate system as approximately shown for illustrative purposes.

Time phasing between beams 70 and 87 as they emerge from disc 84, i.e., between the subliminal and supraliminal temporal intensity variations, can be accomplished by means of relative adjustment of the axes of polarization of discs 85 and 86.

The rectangles 88 and 89 shown in dotted lines on the large polarizing disc 84, respectively delimit the areas of intersection of beams 70 and 87 with disc 84. As will be realized from a viewing of FIGURE 8C, beams 70 and 87 are not directly vertically disposed of each other so as to be either on the X axis of disc 84 or on a line parallel thereto. It should be understood, however, that both beams may actually be colinear with the X axis, with the Y axis, or at any other desired positions, the illustration of FIGURE 8C being chosen simply to indicate that the illustrated type of orientation of the optical paths may be employed if considerations of mechanical design and construction deem it desirable. Since the behavior of light rays through polarizing discs is well known, further explanation of the operation of the system shown in FIGURE 8C is deemed unnecessary.

Modification of an ordinary motion picture projector to effect presentation of subliminal information, as well as the supraliminal information on the film being shown, may quickly and easily be accomplished in accordance with the illustration shown in FIGURE 8D. Actually a second projector 90 is employed in this embodiment, but the light beam 91 therefrom and the beam 92 from the motion picture projector light source (not shown) are effectively combined in light box 93 before projection through film 94, its gate or pressure plate, and lens assembly 95. The light beam combiner may comprise, for example, a beam splitting device, such as the semi-transparent mirror 96, operated in reverse fashion.

Preferably projector 90 is a slide projector, and more preferably, an automatic slide projector, wherein slide holder 97 holds a plurality of slides or matrices containing the subliminal information and allows any one matrix M to be positioned in the path of light beam 91. Power for operating the automatic slide projection apparatus is obtained via cord 98, while power for light source 99, which causes beam 91 is via cord 101. The light sources for either of the projectors may be incandescent or arc, as desired, and that for the slide projector 90 may be pulsed or shuttered at any desired recurrent rate, either periodically or aperiodically, to provide non-continuous presentation of the subliminal information. On the other hand, continuous presentation of the subliminal information, even while the conventional shutter 103 blanks out beam 92 during film advance for example, may be accomplished by continuous light from source 99.

From the foregoing, it will be apparent to those skilled in the art that any standard motion picture projector may be converted in a matter of minutes to additionally project subliminal information. Light box 93 with its mirror 96 already assembled is of such dimensions that it readily replaces the conventional light box in the same position in standard projectors, and projector 90 may be quickly added by easy attachment to and through one of the side doors of the standard projector.

It should be noted that the devices of FIGURES 8, 8A, 8C, and 8D additionally provide automatic control of relative light intensity between the supraliminal and subliminal images since the light intensity of the subliminal image varies directly with the light intensity of the supraliminal image.

As noted heretofore, the novel method of this invention can also be applied in an inventive manner to the medium of television. Numerous complications are presented in the use of such a medium. For example, the television viewer has individual brightness and contrast controls available for manipulation on his own television receiver. In addition, television involves fixed duration of exposure intervals. Compare this with motion picture projection wherein it is possible to vary such duration of exposure by use of shutters having different sector angles as noted heretofore in this specification.

As pointed out with respect to motion picture projection, the light intensity of the subliminal material must be a function of the light intensity of the supraliminal material in order that the subliminal material always remain, in actuality, subliminal. This same axiom, of course, is applicable to television.

In television, the supraliminal material appears at the transmitter as a voltage having a magnitude varying as a function of time. This time varying voltage will be referred to as the standard video signal and it might be derived, without limitation intended, from any of the following:

(a) Live camera pickup.
(b) Motion picture pickup.
(c) Tape recorder pickup.
(d) Combinations of the above with coaxial cable or other transmission from point of origin.

Figure 9:
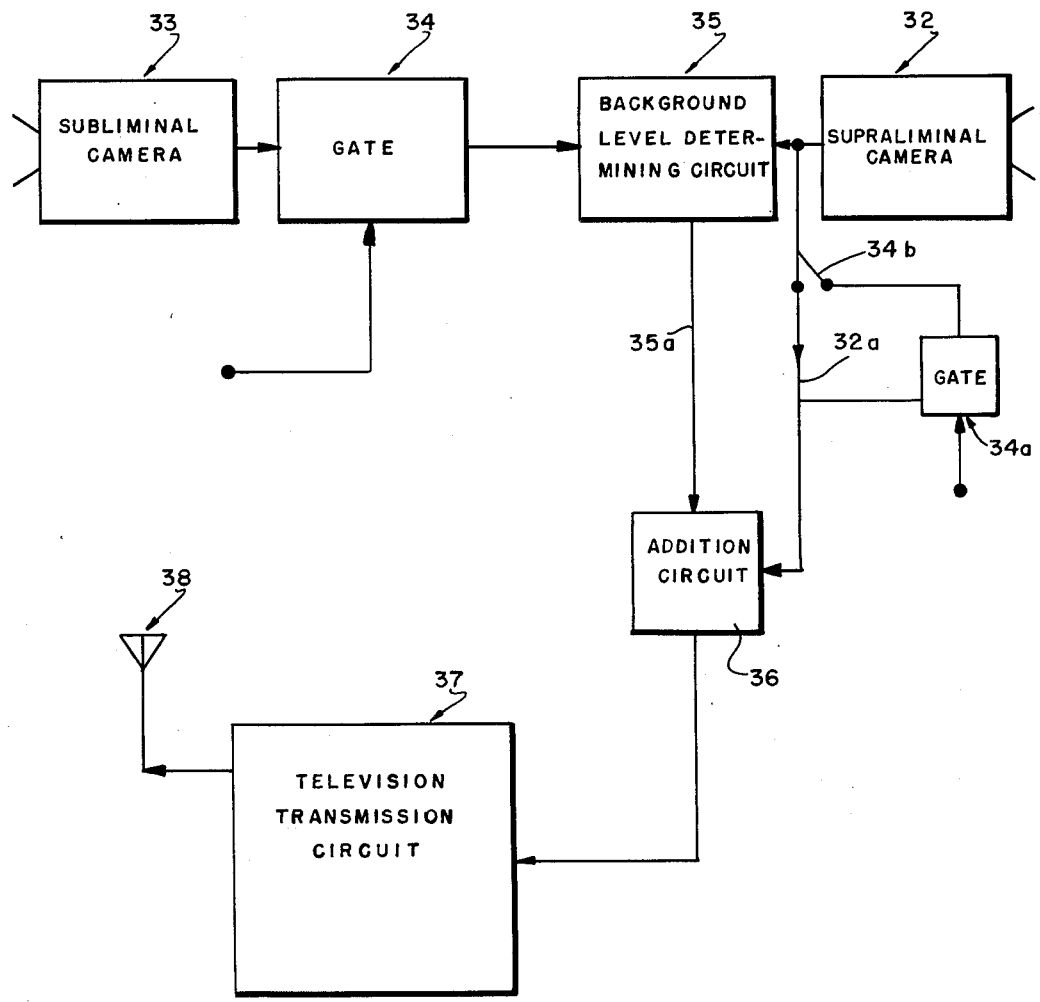
FIGURE 9 is a block diagram of television circuitry embodying this invention.

FIGURE 9 shows in block diagram form an exemplary television transmitter circuit for carrying out this aspect of the invention. Television camera 32 is trained on the scene intended to be presented as supraliminal material, while television camera 33 is trained on a scene to be presented as subliminal material. The video signal output of camera 33 is passed through gate circuit 34. A suitable signal may be placed on the second input to gate circuit 34 to pass or to block video signals through gate 34 from camera 33. Thus, gate 34 may be employed where it is not desired to present the subliminal material concurrently with the supraliminal material.

Gate 34a might be utilized in the circuit by means of switch 34b. Thus, the supraliminal material may also be blocked if it is desired to present only subliminal material or if it is desired to present supraliminal material periodically at a definite rate.

A portion of the video signal output of supraliminal camera 32 may be utilized in a background level determining circuit 35 to control the overall base or background brightness level of the video signals from subliminal camera 33 issuing from gate 34. The video signals from camera 32 inserted into circuit 35 may be integrated if desired, over one or more line scan periods. This integrated voltage can be placed on a tube grid or the like to control the amplification of video signals from subliminal camera 33. Thus, on output line 35a of circuit 35, subliminal video signals are available, nevertheless modulated in intensity dependent upon the average brightness of the supraliminal video signals. This has analogy to the photo-electric cell pick-up in FIGURE 6.

Circuit 35 can also function to achieve modulation in accordance with the instantaneous brightness of each effective picture element of the supraliminal material. Suitable circuitry known in the art is used for this alternative means for controlling the base or background brightness of the video signals from subliminal camera 33.

The modulated subliminal video signals on line 35a and supraliminal video signals on line 32a leading directly from camera 32, can then be added in any suitable addition circuit 36 before presentation to conventional television transmission circuits 37 and radiating antenna 38. Any conventional television receiver tuned to the carrier frequency, will then display video signals whereby will be present the subliminal as well as the supraliminal material.

It will be noted that if subliminal material is to be presented concurrently with the supraliminal material, the gates 34 and 34a may be dispensed with. It should also be noted that the background level determining circuit 35 can be dispensed with if modulation of the subliminal material corresponding to the general brightness of the supraliminal material is not desired.

It can be appreciated that FIGURE 9 does not attempt to show all of the conventional components of a television transmission system, and it should be assumed that otherwise normalization, D.C. level determining and so called D.C. reinsertion circuitry would be provided.

For convenience, the signal as produced from a subliminal information matrix, as via camera 33 for example, will be hereinafter referred to as the $x$ signal, while the standard video signal, such as that produced by the supraliminal camera 32, will be referred to as the $y$ signal. As above indicated, modulation of the $y$ signal by the $x$ signal may be achieved in circuit 35 of FIGURE 9. The type of modulation which may be used to mix these signals includes, without limitation being intended, (1) amplitude modulation per se and (2) multiplication per se. For amplitude modulation, the classical plate, grid bias, or cathode types of modulation processes may be employed. Additionally, a balanced modulator of any desired design may be used and presently provides the preferred type of amplitude modulation for mixing the two signals to provide a modulated signal on output line 35a. As is well known, any type of amplitude modulation of one signal by another, say $y$ by $x$, yields not only a product signal $xy$ but also the modulated signal too. That is, when circuit 35 accomplishes amplitude modulation, the resulting signal on line 35a is $y+kxy$ where $k$ is a constant which helps provide the desired balance between the component signals. Generally, the effective end value of $k$ is set by one or more gain controlling potentiometers within the system, and further reference to $k$ per se will not be made herein, it being understood that the $y$ and/or $xy$ signals as hereinafter referred to are of such relative amplitude as to include whatever balancing factors desired.

With amplitude modulation inherently causing summation of the $y$ and $xy$ signals, circuit 36 need not be employed to accomplish addition but instead may be an OR circuit either of the mere physical junction type or of the more complicated diode-resistance type, for example. However, regardless of whether circuit 36 is an addition circuit or an OR circuit, the television transmission circuits 37 can receive the $y$ and $y+xy$ signals alternately or the latter continuously if desired by use of gates 34 and 34a. For example, if it is desired to present the $y+xy$ signal only for a time (or continuously) gate 34 is enabled and gate 34a is disabled for such time. Of course if presentation of the $y+xy$ signal is desired at all times, line 35a can be connected directly to circuit 37, thereby eliminating circuit 36 and gates 34, 34a. On the other hand, if presentation of only the $y$ signal is desired for a given time period (or continuously) gate 34 is disabled and gate 34a enabled during such time.

It is apparent then that the circuit illustrated in FIGURE 9 fully contemplates the inclusion of an amplitude modulator in circuit 35, or alternatively, fully contemplates modulation by multiplication of the $x$ and $y$ signals with addition thereto of the $y$ signal being accomplished in circuit 36. As above indicated, amplitude modulators of any of the various types are well known in the art and any such may be utilized in practicing this invention. By the same token many different multiplying type modulators or analog multipliers, as they may be termed, are well known and may be incorporated in embodiments of this invention. However, examples of three different types of multiplying modulators in accordance with this invention are now described.

One type of such analog multipliers is illustrated in FIGURES 9A and 9B. When the supraliminal and subliminal information is in the form of signals, such signals may be applied respectively to the horizontal and vertical deflection plates (not shown) of a cathode ray tube 100. Tube 100 is provided with a semi-transparent mask 102 having hyperbolically graded optical density contours. Mask 102 is divided into four quadrants, I, II, III and IV, each of which includes a plurality of equilateral hyperbolas which are disposed at progressively greater distances from the intersection of the X and Y axes forming the quadrants. In each quadrant, the area beneath the hyperbola closest to the axes intersection is shaded heaviest, while the areas between successive hyperbolas are graded in optical density so as to have progressively greater optical transmittance. Mask 102 as shown is placed directly in front of, and preferably contiguous with, the screen of the cathode ray tube 100 with the center of the mask being over the center of the screen. From the foregoing, it is apparent that the optical transmittance of each area element of the mask may be a function of its two dimensional coordinates (X, Y) with respect to the X and Y axes of the quadrant system, and that the optical transmittance is equal to the product AXY where A is a constant for any particular mask.

To perform multiplication by the device shown in FIGURE 9A, four photoelectric cells are disposed in front of mask 102 so that each cell responds only to light flux emanating from a different one of the four quadrants. That is, with the use of a quadrant light divider 104, photoelectric cell 106 responds only to the light flux from quadrant I, cell 108 responds only to the light flux from quadrant II, cell 110 responds only to the light from quadrant III, and cell 112 responds only to the light from quadrant IV. When these photoelectric cells are interconnected as shown FIGURE 9B with the proper potentials from batteries 111 and 113 so as to insure that the instantaneous current of each cell is proportional to the total instantaneous light flux B received by each cell, the net current through resistor 114 will be proportional to the instantaneous luminance function, $$B_\text{I}+B_\text{III}-(B_\text{II}+B_\text{IV})$$

As long as the spot intensity of the cathode ray tube 100 remains constant and independent of spot scanning velocity, which can be assured if necessary by selection of proper phosphor and/or by means of an appropriate feedback circuit, then the instantaneous value of the net current in resistor 114 is proportional to the optical transmittance of the elemental area of the mask through which the cathode ray tube spot illuminates one of the photoelectric cells. Thus, the instantaneous voltage developed across the output resistance 114 is equal to the current therethrough times the resistance thereof, and this instatnaneous product therefore is proportional to the instantaneous product of the two input signals $x$ and $y$, with respect to time, as applied to the horizontal and vertical deflection plates. The signal on output line 116 is therefore the product signal ($xy$) as multiplied by a constant related to the constant A for mask 102.

Besides the beam deflection hyperbolic mask type of analog multiplier which may conveniently be used with a non-transparent type subliminal matrix, another analog multiplier which is preferably used with a transparency having the subliminal information thereon, is shown in FIGURE 9C. This system is similar to that shown in FIGURE 9 except that the product video signal is derived from a modified camera. Light rays 118 emanating from the conscious level scene to be televised are split in any convenient manner such as by a prism, the semitransparent mirror 66 in FIG. 8A, or the V-shaped deflecting device 120 in FIGURE 9C, no limitation to any of these particular devices being intended. The so deflected rays are thereby directed toward two different reflecting surfaces such as mirrors 122 and 124. Mirror 122 reflects the light rays to camera 126 which produces the supraliminal or *y* video signals on line 128 adjusted in gain as desired by the potentiometer 130. The light rays deflected by mirror 124 are directed to the subliminal camera 132. It is apparent, of course, that mirrors 122 and 124 though preferably used are not essential to operation of this system since cameras 126 and 132 can respectively be disposed to receive the two light rays from beam splitting device 120. A transparency 134 which contains the subliminal information is placed in front of the photosensitive mosaic of the pickup tube in camera 132, and the light rays from mirror 124 are focused on the transparency and pass therethrough. The output signal from the subliminal camera as suitably adjusted in gain by potentiometer 136 is consequently the product ($xy$) as multiplied by an appropriate constant.

Still another analog multiplying type modulator is illustrated in FIGURE 9D. This figure also shows the invention as it may be related to either video or audio signals, and either a transmitting or receiving device. That is, the supraliminal signal source 140 may be considered as a source of either video signals or audio signals, and these may be obtained from any number of different sources such as a television camera, a microphone, or the video or audio detecting circuits in television or radio receivers. Assuming the supraliminal signal source is a television camera, the circuit of FIGURE 9D is similar to that of FIGURE 9 and source 140 could thereby be correlated to camera 32 of FIGURE 9. However, as above indicated, it is to be understood that the supraliminal signal source 140 of FIGURE 9D can be a video signal detector or the like in a television receiver. The same, of course, applies to audio systems.

In like manner, utilizer 142 refers to the appropriate corresponding utilizing means of the type system employed. For example, if the supraliminal signal source 140 is a television camera, utilizer 142 may be considered as the television transmission circuit 37 of FIGURE 9. If the source 140 is the video detection system of a receiver, the utilizer 142 would, of course, be the usual cathode ray tube circuitry in the receiver. Corresponding considerations for audio systems may likewise be applied.

FIGURE 9D illustrates several modifications, one of which is the switching between the supraliminal signal and the summed signal ($y+xy$) from time to time. That is, switch 144 (which may be considered as an electronic switch including, for example, two pentodes which are alternately turned off and on by the signals on lines 146 and 148) alternately passes the input signals present on lines 150 and 152 to line 154 and thence to utilizer 142 when switch 156 is in its up position. The signals on input lines 150 and 152 may respectively be considered the supraliminal or *y* signal and the summed signal ($y+xy$), both properly adjusted in gain to provide the desired results. Switching between the two signals is accomplished by applying pulses to the flip-flop circuit 158 in such a manner that it will toggle between its two stable states and provide automatically high and low voltage output signals alternately on both output lines 146 and 148. Such pulses may be obtained from a pulse source 160. The pulses may be of any desired repetition rate, and may be for example synchronizing pulses such as the vertical or horizontal synchronizing pulses in a television transmitting system or similar pulses extracted from a television receiver system. Preferably, the pulses are vertical synchronizing pulses in a television system, but limitation thereto is not intended since other repetition rates including horizontal pulse rates or groups thereof, or multiples and submultiples of either horizontal or vertical synchronizing frequencies may be used. In audio systems, the pulse rate is preferably at a frequency sufficiently high to prevent audibility of any switching transients produced. However, lower switching frequencies may be employed where the switching transients, if any, are not distracting or if a switching transient squelching system is used. Additionally, as will be later described, the *y* and *xy* signals in either audio or video systems may be applied simultaneously, preferably in the form of a summed signal, to the utilizer 142 with no switching therebetween whatsoever.

To effect modulation of *x* and *y* signals, the *y* signal from the supraliminal signal sourec 140 is applied through a gain controlling potentiometer 162 and amplifier 164 if desired to scanner 166. This scanner is preferably of the flying spot cathode ray tube type. The subliminal information as present on the matrix 168 disposed in front of scanner 166 is scanned line-by-line by the flying light spot emanating from scanner 166 at any desirable line and field rate as caused by the frequency of signals from sources 300 and 302 when switches 308 and 310 are in their most counterclockwise position. Since the beam in the scanner is modulated in intensity by the *y* signal as delivered thereto from amplifier 164, the signal produced by photoelectric cell 170 is an *xy* product signal, *x* being referred to the subliminal information on matrix 168.

Preferably, the photoelectric cell 170 takes the form of a photomultiplier with the several resistors 172 being connected between the different dynodes, the first of which is coupled to a source of B+ via resistor 174. The last dynode is coupled in common with cathode 176 to ground through a gain controlling potentiometer 178 and condenser 180 when switch 182 is in its rightward position. The plate or collector 184 of the photoelectric cell is coupled to B+ in the usual manner through resistor 186, and also to tube 188 via condenser 190.

As is well known, a vacuum tube may be operated to cause inversion of a signal, or alternatively, may be opearted as a cathode follower wherein no signal inversion takes place. Taking advantage of this fact for purposes presently more apparent, the outputs from both the plate and cathode circuits of tube 188 are respectively coupled via condensers 192 and 194 and potentiometers 196, 198 to switch 200. In one embodiment, switch 200 may be considered merely as a single-pole (or double-pole, if desired) double-throw mechanical type switch, switchable manually or automatically in any periodic or aperiodic manner, without lines 202 and 204 and associated circuit being connected thereto. With such a switch, the polarity of the product signal delivered to output line 206 from the switch, may be changed as desired as between positive and negative product signals. With the product signal on line 206 being applied to the summer or addition type circuit 208, preferably via a gain controlling potentiometer 210 and amplifier 212, if desired, over line 218, and the *y* signal as obtained in its proper proportion by gain controlling potentiometer 216 being applied to summer 208 over line 220, the output of summer 208 on line 214 is the *y* signal plus the *xy* signal with the polarity of the latter signal being determined by switch 200. Therefore, in a television system, for example, it is apparent that the subliminal information may be presented as either relatively light material or on a blacker background or relatively dark material on a whiter background.

Addition or summing circuits are well known in the art, and summer 208 may take the form of, for example, two triodes whose cathodes are commonly coupled and whose grids are respectively connected to input lines 218 and 220. Output line 214 is then coupled to one of the plate circuits of the two tubes.

With the signal on line 214, and consequently on line 152, being the sum of the *y* signals and the product signals *xy*, in properly controlled proportions, switch 144 provides these signals as summed to line 154 when in one of its states. When the switch is in its opposite state, only the *y* signals as present on line 150 are applied to line 154. Therefore, when switch 156 is in its up position, utilizer 142 alternately receives *y* signals and then $y+xy$ signals. If it is desired to present the subliminal information continuously, rather than periodically such as on alternate fields in a television system, switch 156 may be placed in its downward position so that the $y+xy$ signals on line 214 are applied directly to utilizer 142.

Mention was above made that in one embodiment switch 200 of FIGURE 9D is a mechanical type switch for changing the polarity of product signals. Alternatively, this switch may be of the electronic type similar to switch 144 so as to cause automatic change between the two possible polarities of the product signals at predetermined times. Such automatic switching may be accomplished (1) without regard to the intensity or amplitude of the supraliminal signal, (2) with regard only to such, or (3) by combination of (1) and (2). To accomplish (1) trigger circuit 230 may be a flip-flop which is toggled between its two stable states by successive pulses from source 231 when switch 233 is positioned downwardly. Such pulses may be derived from any source within or without the system being used and may be of any frequency desired. Relative to (2) assume the normal situation of a white background with supraliminal information being shown in different hues or in shades of gray to black, and further assume that subliminal information is to be presented during the whole of one or more given fields in the form of relatively dark information on a whiter background. It then becomes apparent that the subliminal signal will be decreased in intensity sufficient to be at least substantially, if not wholly ineffective when the supraliminal signal is at least such as to cause a black or nearly dark screen. Under such circumstances, the polarity of the subliminal or product $xy$ signal may be changed so as to cause relatively light subliminal information on a darker background.

To maintain the presentation of subliminal information throughout any given time period, regardless of the shade or color of the supraliminal information (i.e., so as to effect (2) above), a system such as further shown in FIGURE 9D may be employed. With the supraliminal or $y$ signal being changeable from a white level to a black level for example, a given threshold may be established between these levels so that a movement of the $y$ signal across the threshold in either direction effects switching of switch 200. For example, the threshold level may be set so as to be equal to a signal causing a 50% brightness level, or at any other higher or lower level as desired. Then, when the $y$ signal moves from white toward black and crosses the threshold level, a signal is produced for example in the manner to be presently described, to effect switching of switch 200. Conversely, when the $y$ signal reduces its amplitude from black to white and recrosses the threshold level, switch 200 is caused to switch back to its other state. The threshold level which causes the switch to change its state may be established by the circuitry including potentiometer 222, coupling condenser 224, clamping diode 226 with the associated voltage determining circuitry as connected to its plate, amplifier-clipper 228, switch 233 in its up position, and trigger circuit 230. The trigger circuit 230 acts to cause an enabling signal on line 202 when the $y$ signal crosses the threshold level in one direction, and an enabling signal on line 204 when the $y$ signal crosses the threshold level in the opposite direction. Therefore, the output of switch 200 changes from one polarity to the other polarity each time the $y$ signal crosses the threshold level.

To accomplish (3) above whereby the polarity of the $xy$ signal is changed in accordance with both the pulses from source 231 and a threshould level, pulses from source 231 and the output from amplifier-clipper 228 may be commonly coupled to the input of trigger circuit 230 without any further considerations especially when the threshold level is equal to or in the general amplitude area of a signal causing approximately 50% brightness. However, when the threshold level does not correspond to approximately the 50% brightness level, sensing means may be placed in line 206 to sense the existing polarity of the $xy$ signal and to provide a signal to gate the pulses from source 231 so as to prevent polarity changes when the $y$ signal is on the black side of the threshold level and the $xy$ signal is already of a polarity causing effective communication thereof.

Reference has heretofore been made to the effect that the circuitry of FIGURE 9D is, in any of its different forms, applicable to audio systems and this is especially true if switch 144 is switched at speeds high enough not to cause objectionable audio transients. An alternative to employing switch 144 as shown in FIGURE 9D is the use of a switch or gate in line 206 with switch 156 positioned downwardly, whereby the signal to utilizer 142 may be either $y$ or $y+xy$. This is applicable to either audio or video systems and is similar to one use of gate 34 in FIGURE 9. Instead of adding a gate in line 206, switch 200 may of course be modified to cut out the $xy$ signal when desired. With the use of either an added gate of the modification of switch 200 in an audio system, effects from transients produced by such gating or switching would be inaudible to a listener since the intensity of the subliminal audio or product signal as reproduced is below the conscious level of recognition.

Because of the differences in the physical nature of video and audio signals and in the physiological transducing mechanisms for handling the two types of signals, optimalization of subliminal audio communication may be effected by causing the supraliminal signal $y$ before multiplication thereof by the subliminal signal $x$ to pass through a rectifier-integrator system or other generally non-linear system to provide a modified supraliminal signal Y. If an amplitude modulator is then used to combine the $x$ and Y signals, the result is $Y+xY$ wherein the product signal component is desirably balanced with the Y signal component. Since the final signal desired in this case is $y+xY$ in proper proportions, a subtractor may be coupled to the Y source and modulator to provide the desired $xY$ component and the original supraliminal signal may be added thereto in a summing circuit. Of course, if an analog multiplier per se is employed to form the product signal $xY$, no subtractor is required.

From all the foregoing relative to FIGURE 9D, it is of course apparent that any of the heretofore referred to analog multipliers may replace the scanner-photoelectric type analog multiplier of FIGURE 9D so as to be operable with the remaining circuitry thereof in any of its numerous embodiments.

It is important to note at this point that certain experiments which have been conducted have indicated that modulation of the light intensity of either or both the subliminally presented material and the supraliminally presented material at brain wave frequencies increases the effectiveness of the subliminal stimulation. Of particular significance is the modulation of the resulting light intensity of the subliminal information and/or the supraliminal information by what is known in the art as the "alpha rhythm" frequencies including multiples or submultiples thereof. Modulation by such brain wave frequencies can also be incorporated in the repetition rate of presentation of the subliminal material.

As is know in the art, a normal range of alpha rhythm frequency response is found in any group of individuals. That is to say, every individual has a certain frequency of effect to which he is particularly receptive. Accordingly, using an average brain wave frequency designed for the particular individuals to whom this invention is being applied has been found to significantly increase the results obtained. As above indicated, modulation may be not only at alpha frequencies, but also at other brain wave frequencies, and significant results may likewise be obtained.

Increasing the effectiveness of the subliminal information by modulation with brain wave frequencies such as a frequency or frequencies from the alpha range of frequencies, may be accomplished in a number of different ways. For example, any of the different methods mentioned hereinafter relative to motion picture projection may be employed. Additionally, the ambient illumination on a studio television scene being scanned can be modulated in intensity either continuously or periodically in phase with the periodicity of the use of the summed $y$ and $xy$ signals. Alternately, the ambient illumination of a television screen and/or viewing area could likewise be intensity modulated.

Further intensity modulation can be caused by modulating the $y$ or $x$ signals or any combination thereof as produced, for example, in FIGURE 9D. With reference to this figure again, it will be noted that oscillation producing means 232 may be connected by switch 182 into the cathode circuit of the photomultiplier 170. When so connected, the product signal collected by plate 184 will be modulated at a frequency determined by modulator 232. Preferably, such a frequency is one of the brain wave frequencies such as alpha. An average alpha frequency for adults is approximately 10 cycles per second, although limitation thereto is not intended, and production of such a signal whether sinusoidal or not may be accomplished in any well known manner. For example, oscillation producing means 232 may be just a 10 cycle or the like oscillator.

However, in a television system wherein low frequency response is poor, for example in a system wherein D.C. brightness levels are not reinserted by means of some type of D.C. restorer device, such a frequency may be produced in accordance with this invention, by utilization of two other frequencies which differ by the brain wave frequency desired. When the circuit of FIGURE 9D is employed in a television transmitting and/or receiving system, the brightness of any viewing screen in the system can be caused to vary effectively at the desired modulation frequency, regardless of the frequency response ability of a receiver, by causing such brightness variations either along the horizontal direction only, the vertical direction only, or both. Variation along one direction only may be produced by modulating a wave of the corresponding synchronizing signal with another frequency slightly different therefrom. For example, a sinusoid or other type wave of conventional line frequency, 15.75 kc./sec., may be modulated by another signal which is, for example, 10 cycles lower or higher than the horizontal line frequency signal so as to effectively produce the desired brain wave frequency variation. Modulation of the two signals may be accomplished either by algebraic summation, multiplication or amplitude modulation. As will be apparent to those of ordinary skill in the art, the output of oscillation producing means 232 under such circumstances is not merely a 10 cycle (or the like) wave, but contains waves of the basic frequencies as well. Therefore, when the basic modulated signal is of the line frequency of the system, brain wave frequency modulation is mainly along the horizontal direction of the screen. Likewise, if the basic modulated signal is of field frequency, the desired brightness modulation occurs mainly along the vertical direction of the screen. Moreover, the brightness of the screen may be varied in both horizontal and vertical directions by combining the two modulating systems.

Instead of modulating the $xy$ signals in FIGURE 9D at the cathode of photomultiplier 170, brain wave frequency modulation in any of the manners above described may be applied to the system at any one of a number of other different locations. For example, such modulations may be applied at junction 234 whereby the $y$ signal intensity before multiplication with the $x$ signal is modulated. Alternatively, the $y$ signal as present at junction 236 can be modulated so that the summed output on line 214 varies accordingly. Again, alternatively, the $xy$ product signal on line 218 may be modulated at junction 238, or the summed output itself as present on line 214 may be modulated as at junction 240. The latter may conveniently be done since any normally resulting flicker of the visual message may be regulated by controlling the amplitude of the modulation.

Brain wave modulation is not intended to be limited to the circuitry shown in FIGURE 9D, but may be included in any of the systems heretofore described, and methods for so including same will be hereinafter referred to particularly relative to motion picture apparatus. As to the television circuitry shown in FIGURE 9, gates 34 and 34a can be used to vary the presentation of both, or either, the subliminal and supraliminal information at any desired frequency.

Although, in FIGURE 9D, the matrix 168 which contains the subliminal information, has been referred to as a transparency, it is to be understood that the matrix may actually be non-transparent with the information thereon having a different reflective characteristic relative to the background of the matrix. In this manner, the photoelectric cell may be placed on the same side of the matrix as the scanner 166, and the result will be the same as though the matrix were transparent. Use of the term "absorption characteristics" relative to the matrix is meant to include both the concepts of a transparent matrix or one which is non-transparent but reflective of the information. That is, it may be said that the information on the matrix differs in its light absorption characteristics from that of the background portion of the matrix regardless of whether the matrix is of the transparent type or of the non-transparent type.

Figure 10:
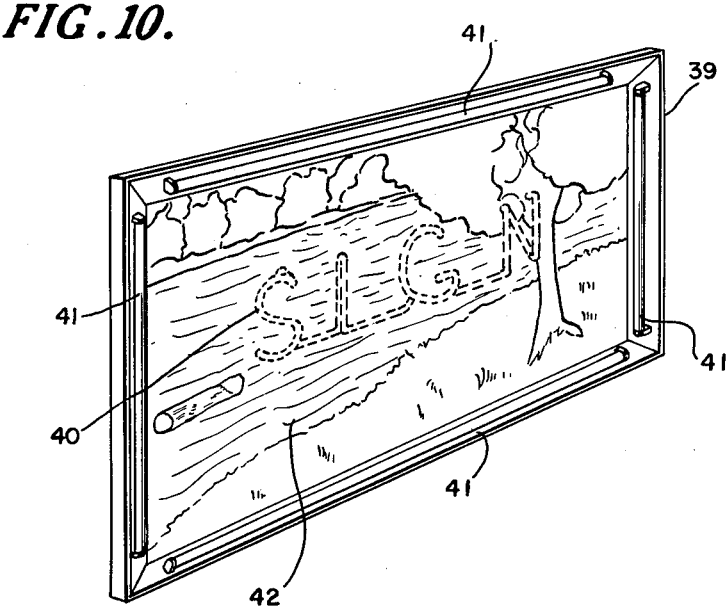
FIGURE 10 is a perspective view of a sign board embodying this invention.

Reference is made to FIGURE 10 in connection with the use of the invention with sign 39 for advertising or other purposes for which stationary information presenting means may be employed. This application comprises stationary presentation of both the supraliminal and subliminal material. In other words, motion pictures are not utilized. With respect to FIGURE 10, alteration and control of brilliance of subliminal material presented by sign lights 40 may be accomplished by means of and for time durations and/or light intensities like those used in the motion picture and television techniques described above. Lights 41 represent the lighting fixtures of an ordinary sign board with translucent background material 42, well known in the art, and, of course, can be of any configuration such as is seen on the standard neon or fluorescent signs. It should be appreciated that background material 42 covers sign lights 40 during the off period of the latter.

Other apparatus for presenting both subliminal and supraliminal information in stationary form is shown in FIGURE 10A. The front of cabinet 250 has an aperture preferably including a viewing glass (not shown) and in which is disposed a transparency 254 containing a visible picture or sign, preferably of an appealing nature, representing the conscious level or supraliminal information. Behind the transparency 254 are two circular fluorescent tubes 256 and 258, preferably concentric, suspended in the cabinet 250 in any desirable manner. The fluorescent tubes are regulated in operation by variacs 260 and 262, respectively, or collectively by either if desired, to produce an even distribution of the proper amount of light onto the back of transparency 254. Suspended preferably approximately in the plane of the inner fluorescent tube 258, is another transparency 264. This transparency contains the subliminal information such as "Drive Safely," as shown. For purposes of presenting such information subliminally, there is mounted in the cabinet 250 a source of light 266 along with light baffle 268 which contains a slit of desired width and height for directing light onto the subliminal transparency 264. Those rays which impinge upon areas of high optical transmittance pass through the subliminal transparency 264 with relatively small attenuation, and then subliminally transilluminate the conscious level transparency 254 at the viewing side of the cabinet. However, those rays from light source 266 which impinge upon relatively opaque areas of the subliminal transparency 254 are, of course, absorbed in inverse proportion to the optical transmittance of the subliminal transparency. Thus, an image of the subliminal information effectively appears on transparency 254 as though modulated in illuminance value at every elemental area by the optical transmittance of the conscious level information appearing on transparency 254. With a proper balance between the subliminal light from source 266 and the supraliminal light from the fluorescent tubes, an image of the subliminal information on transparency 254 is effectively transmitted to a viewer looking at the supraliminal information on transparency 254 without conscious knowledge by him of receiving the subliminal information. Preferably, the source of light 266 for illuminating the subliminal information on transparency 254 is produced by a short arc mercury vapor discharge lamp, although limitation thereto is not intended. When the light source 266 as regulated by variac 270, and fluorescent tubes 256 and 258 are operated from a 60 cycle alternating current source, each of the light sources emit pulses of light which resemble a fully rectified 60 cycle current wave. Both the subliminal transparency 264 and the supraliminal transparency 254 are consequently pulsed in a luminous sense at a repetition rate of 120 pulses per second. The pulses of light from source 266 relative to the pulses of light from the fluorescent tubes may be in phase or out of phase to any desired degree, but when a phase shifting device 272 is employed to shift the relative phase of the light pulses, for example 90°, easy monitoring of the presentation of the subliminal information is effected.

The supraliminal information on transparency 254 is preferably in color for greater appeal purposes, but limitation thereto is not intended since such conscious level information may also be presented in black and white form.

Still other apparatus for presenting subliminal and supraliminal information in stationary form is illustrated in FIGURE 10B. In this case, a thin rectangular clear slab 280, comprised of an acrylic resin for example, such as sold under the trademark "Lucite," is held upright in any desired manner, and is preferably roughened on the front side by sand blasting or similar methods to cause the light from fluorescent tube 282, as directed upwardly by shade and/or reflector device 281 through the slab 280, to be effectively scattered forwardly therefrom in substantially a uniform manner. Over the roughened front side of the material is placed a visual transparency 283 which contains the supraliminal information to be consciously conveyed to the viewer. On the rear side of the material is disposed another transparency 284 which contains the information to be presented subliminally. For transmitting the subliminal information to a viewer at a preconscious level, light from a second fluorescent tube 286 is controlled in intensity in any desirable manner and reflected by reflector 288 in equal degrees to each elemental area on the subliminal transparency 284. Additional conscious level and/or subliminal light sources may be disposed at any of the other edges of the Lucite slab 280.

A modification of the apparatus shown in FIGURE 10B is the use of the currently available electroluminescent materials for producing light merely by the contact thereto of electrical current. With such a material, conscious level light source 282 in FIGURE 10B may be eliminated, but the additional subliminal light source 286 and reflector would still be necessary. Rather than transparencies containing the subliminal and supraliminal information, the information could be directly imposed upon the electroluminescent material. This is true, of course, also for the apparatus of FIGURE 10B. That is, in either instance, the subliminal or supraliminal information may be pasted or otherwise disposed on opposite sides of the Lucite or electroluminescent material.

With any of the stationary type embodiments shown in FIGURES 10, 10A, or 10B, for example, the subliminal information may be presented either as dark symbols on a lighter background or light symbols on a darker background, as desired. Additionally, alternation therebetween at any periodic or aperiodic rate by suitable manual and/or automatic means may be employed if desired.

In connection with stationary presentation of both the subliminal and the supraliminal material, an instrument commonly called a magic lantern may be used. This is a device incorporating a ground glass type of screen on which information is usually presented from behind. Along the same lines, an illuminated wall with subliminal material superimposed thereon can also be used in the method. In both instances, supraliminal material can be coincidentally presented on the screen and illuminated wall, respectively.

Figure 14:
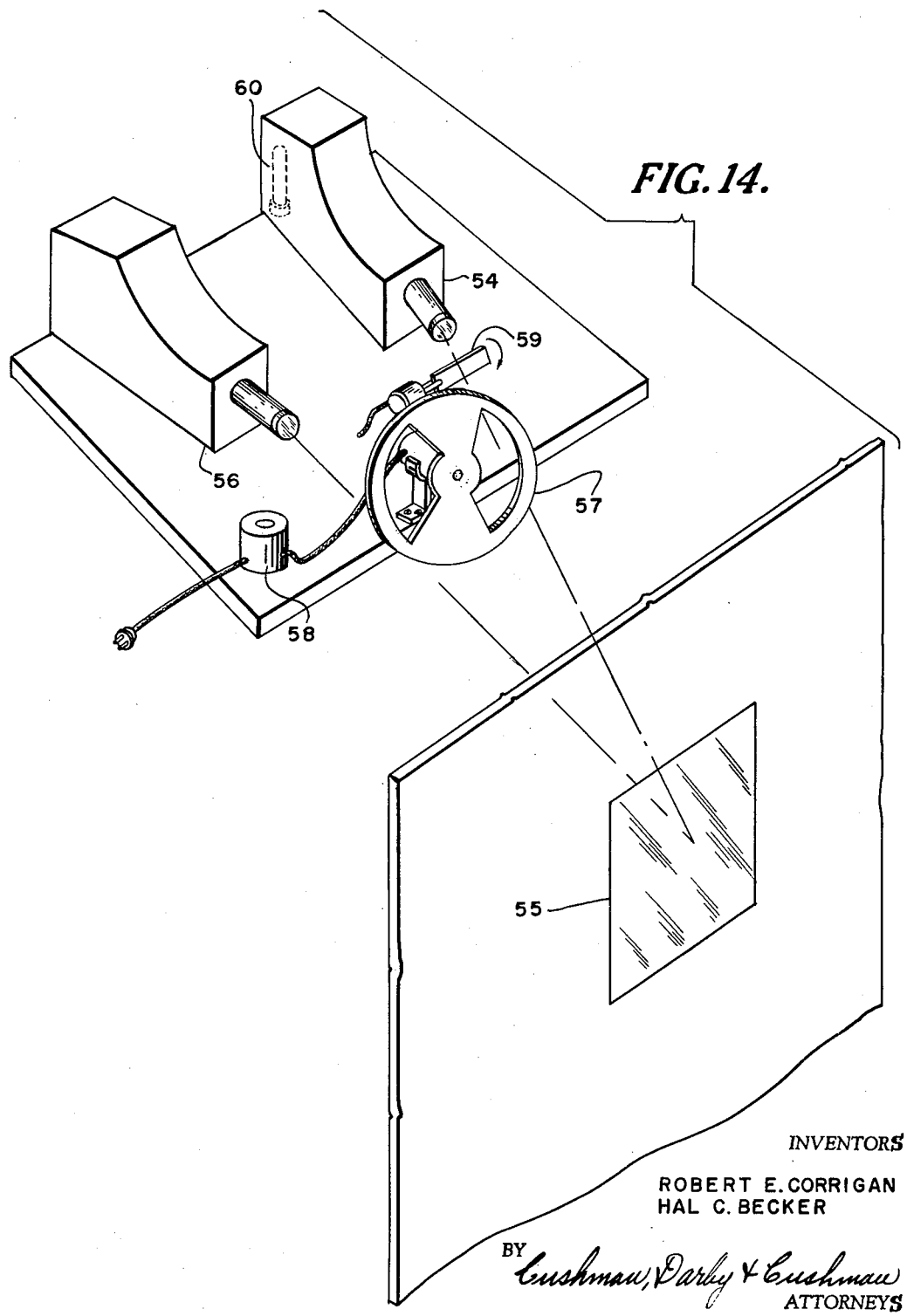
FIGURE 14 is a perspective view of a magic lantern assembly.

One means for utilizing the magic lantern devices is illustrated in FIGURE 14. This apparatus operates in a manner somewhat analogous to the dual projectors described above. Slide projector 54 contains two slides. One slide involves the subliminal material while the other involves the supraliminal material. These slides are inserted into projector 54 so that they are adjacent to each other and simultaneously focused on projection screen 55. Of course, the purpose of the slide containing the supraliminal material is to modulate the light output of projector 54 in accordance with the contents of the material being presented supraliminally.

Slide projector 56 contains one slide relating to the supraliminal material. The projected images of projectors 54 and 56 are superimposed on the ground glass screen 55 by proper spatial alignment of the two projectors.

Rotating shutter 57 is a disc with two fan-shaped apertures and two webs, as shown, which serve to produce alternately projected images on the screen by the two projectors. The angular velocity of the shutter disc 57 is controlled by means of a variac 58 which supplies a controllable voltage to a series wound electric motor on whose shaft the disc is mounted.

Alpha or other brain wave modulation of the intensity of the beam from projector 54 is accomplished by the rotating rectangular metal vane 59. Such modulation can, of course, be applied to either projector 54 or projector 56, or both, either before or after shutter 57, and can of couse be used in any of these manners for the motion picture embodiments, or as a matter of fact for the television embodiments heretofore described.

The intensity of the projection bulb 60 of projector 54 is controlled so that the material to be projected subliminally remains subliminal. Also, adjustability of bulb 60 permits compensation for different conditions of ambient illumination in the viewing area.

In connection with the foregoing, many modifications are contemplated including provision of mirrors in order to achieve a sufficiently long optical path from lens to screen within an enclosure of more reasonable size. Another modification relates to the use of an optical system in which images are printed on opaque materials and can be used with an appropriate shutter arrangement to provide coincident projection of subliminal and supraliminal material on a ground glass screen.

FIGURES 11 and 12 illustrate one means for using the alpha or other brain wave frequency modulation concept in motion picture apparatus. Shown in FIGURE 11 is a device which embodies a rotating disc 43 driven by an electric gear reduction motor 44. The periphery of this disc is not of constant diameter, but, rather, has a diameter which varies cyclically as a function of position as shown in FIGURE 12. Thus, the periphery of the disc contains peaks 45 and valleys 46 which occur in periodic fashion as the periphery of the disc is traversed. These peaks and valleys pass before the projector lens 47 as shown in FIGURE 12 so as to cyclically modulate the light output of the projector at a given frequency or throughout a particular range of alpha and/or other brain wave frequencies if the peaks and valleys are disposed somewhat aperiodic around the periphery of the disc.

The illustrated device can be used on a single projector apparatus such as shown in FIGURE 8 or with a dual projector system. As can be appreciated, in the case where two projectors are utilized, it would only be necessary to drive a second disc (not illustrated), properly situated in the light beam of the second projector, either (a) by means of a mechanical linkage between the two discs or (b) by means of another motor synchronized with the drive motor, to cause light intensity modulation of both the supraliminal and the subliminal material.

FIGURE 13 illustrates another device for accomplishing brain wave frequency modulation but in a somewhat different manner. The device is shown as mounted on the subliminal image projector 48. This device consists essentially of a metal vane 49 having a given width W which may be equal to, greater, or smaller than the diameter of the projection lens aperture 50, and a length somewhat greater than the diameter of the projection lens aperture 50. The metal vane 49 can be fabricated from a sheet of thin metal and is positioned in such a way as to be interposed on the optical axis between the projector lens aperture 50 and the projector screen (not shown).

A small electric motor 51 is mounted on projector 48 by bracket 52 and is connected to the vane 49 by means of the shaft 53 as shown, which supports the vane mechanically and also rotates the same at an appropriate angular velocity, the latter depending upon the frequency of modulation desired, whereby light interruptions at an appropriate brain wave frequency are accomplished either completely or partially according to the width W of vane 49.

The intensity modulation of the projector light beam in the case of FIGURE 13 is not sinusoidal as in the case of the device illustrated in FIGURES 11 and 12. Actually, the type of modulation, as a function of time, derived from the subject device, is similar to that of a sinusoidal wave which has undergone full wave rectification. In this respect, the device of FIGURE 13 is limited so as not to permit a modulation function having any characteristics desired, as is possible by use of the device of FIGURES 11 and 12. However, the simplicity of the device of FIGURE 13 warrants utilization in particular circumstances It should be noted that the metal vane 49 of FIGURE 13 can be painted on both sides with a flat black paint so as to reduce, as much as possible, light reflected from the vane as it rotates in the projected beam. However, this metal vane can be coated with a reflecting material so that advantage can be taken of light reflected therefrom as it rotates. Such modulated reflection can be used as a frequency modulation of ambient illumination, thus imparting, for example, brain wave frequency effects in two ways.

Numerous other ways for modulating the light rays resulting from the subliminal and/or the supraliminal information by brain wave frequencies or the like are possible. For example, the intensity of the light source or sources may be modulated at the desired frequency in a manner similar to that shown in FIGURE 6. Also, the ambient illumination of the viewing screen and/or the viewing area may be intensity modulated in any desired manner, reference being made to FIGURE 7 wherein variac 24 may be either automatically controlled to cause variable illumination or may be replaced by a modulating light valve similar to that shown in FIGURE 6, for example. Other means for intensity modulating the desired light rays at brain wave frequencies include the use of rotating and stationary cylinders or sectors similar to the ones shown in FIGURES 5 and 8A, or polarized discs like those illustrated in FIGURE 8C. Still other methods include the use of a semi-transparent graded density rotating disc or cylinder, or the cyclic variation of an appropriate aperture diameter. All of the mechanical means herein mentioned to accomplish brain wave modulation relative to projection equipment, can, of course, be likewise applied where suitable to the television and stationary embodiments of this invention.

Besides use of brain wave frequency modulation, the efficiency of the inventive process may be increased by imparting motion to the subliminal information resulting on a viewing screen or the like. One way of doing this is to take a subliminal information matrix and physically move it about from time to time, thereby displacing it periodically or aperiodically as between two or more positions in front of its light beam so as to effect movement of its image on a screen. Where an endless loop of subliminal information matrices in the form of film frames is used, as for example in the different embodiments referred to in FIGURE 1, whether a blanking loop is employed or not, motion may be imparted by relative displacement of the subliminal information in successive frames thereof similar to the way movement is imparted in cartoon films. Motion may be similarly imparted when a still projector is used, in any of the manners herein described, in conjunction with a plurality of slides interchangeable automatically or otherwise.

The foregoing methods of imparting motion are applicable not only to motion picture systems, but also to stationary displays, audio, and television systems. In an audio, television, or any other system wherein the subliminal information is scanned electronically, as by camera 33 in FIGURE 9 or the flying spot cathode ray tube 166 in FIGURE 9D for example motion in any desired time pattern may be effected in any of a number of different ways. For example, as shown in FIGURE 9D, the horizontal and/or vertical sweep voltages from sources 300 and 302, respectively, may be modulated by an algebraic summation process with any desirable signal frequencies in modulators 304 and 306 when the corresponding switch 308, 310 is thrown clockwise. With such modulation, the sweep voltage sawtooth wave is effectively moved as a whole up or down by virtue of variation in its D.C. base, thereby causing the scan to begin on time, or early or late to any desired degree. Preferably, the modulation is such as to keep the sweep voltage or voltages on a given D.C. base for a plurality of fields so that the desired movement effect is not obviated by the movement being too fast. Rather than using modulators 304 and 306, the respective synchronizing pulses normally employed to trigger the sweep oscillators 300 and 302, can be variously delayed to effect the desired movement.

It has been pointed out heretofore that aural techniques somewhat analogous to the visual techniques described above will permit effective use of the method via the aural sensory receptors of man. This can be achieved separately from or simultaneously with process operation via visual sensory apparatus.

Although prior workers in the aural field have achieved subconscious stimulation by means of subliminal presentation of stimulus material, and have attempted simultaneous presentation of subliminal and supraliminal aural material without any modulation of the latter by the former, none has utilized such subliminal presentation per se temporally interleaved with supraliminally recognizable aural stimulus material. The following technique, utilizing the principles of our invention as applied to temporally interleaved supraliminal and subliminal aural presentation is hereinafter described.

The two aural stimuli are presented periodically and separately at a supersonic rate of presentation, i.e., at a frequency above the range of audibility of man. The analogy between this technique and the visual technique is clear in that, in the visual technique, critical flicker fusion frequency of man must be exceeded when the supraliminal and subliminal stimuli are interleaved, whereas in the aural technique, frequency of presentation must lie outside of the range of audibility of man. Any other presentation would result in audibility of the subliminal aural material and visual perception of the subliminal visual material, as the case may be.

Thus, in this embodiment of an aural technique according to this invention, alternate pulses of audio supraliminal and subliminal material are present. The parameters which determine the effect of the technique are similar to those outlined heretofore in connection with the visual technique. These are:

(1) Interleaving repetition rate.

(2) Relative (and absolute) temporal durations of supraliminal stimulus pulse versus subliminal stimulus pulse.

(3) Relative (and absolute) sound intensities of the two sets of pulses, and (4) Background or ambient aural conditions of the subject's environment.

Particular apparatus utilized in applying this aural technique is not specifically illustrated but can be appreciated from a consideration of the method described, especially in view of the circuitry of FIGURES 9 and 9D. The equipment basically involves a source of supraliminal and subliminal audio material along with an electronically controlled device, such as switch 144 in FIGURE 9D for example, to properly control the sequence of presentation periods of the respective audio material, as well as the duration and intensity of such material. The ambient aural conditions are controlled by standard means of regulating sound environment.

Incidentally, increasing the effectiveness of the aural technique may be accomplished by imparting motion to the resulting subliminal sound as by change thereof from one speaker to another in a multi-speaker system, or by simultaneously modulating the intensity of any or all of the above listed parameters at stipulated frequencies, such as alpha rhythm frequency. The equipment for modulating such parameters may be similar to that shown in FIGURES 9 and 9D and it as well as motion imparting means can be readily realized through the use of standard sound equipment combined in such a manner to accomplish this invention.

In connection with the above aural technique, considerable stress has been placed on the temporal interleaving of the aural supraliminal and subliminal stimulus material. This does not mean that simultaneous presentation of such material is not contemplated especially in any embodiment wherein the supraliminal signal is modulated by the subliminal signal as previously referred to relative to FIGURE 9D, but, rather, that interleaving without employing xy signal modulation would appear to be more effective in accordance with the invention, than simultaneous presentation without such modulation.

The invention is applicable to the use of color for the presentation of both subliminal and supraliminal material, and such is contemplated by this application.

Throughout this specification it has been emphasized that various environmental and psychological factors can add or detract from the results attained by the utilization of the novel method and apparatus. These variables are, to a great extent, independent but should be noted as follows:

(1) The effect in reception of subliminal material as a function of a subject's conscious reaction towards the supraliminal material.

(2) The effect of established preferences for specific subliminal material on the expressed conscious state of feeling toward the supraliminal material.

(3) The effect in reception of subliminal material as a function of environmental factors associated with the presentation of both the supraliminal and subliminal material. These specific environmental factors include, for example, (a) the location of the individual during the presentation of the subliminal and supraliminal material, and (b) physical conditions such as temperature, spurious light, the presence of annoying elements, e.g., insects, and the like.

In connection with the above factors, it should be stated that normally, since both positive and negative factors are interacting simultaneously, the negative factors tend to be cancelled out with the net result being determined by the statistics of the system.

With respect to the experimental tests noted above, the tachistoscopic instrument used is an optical device which, in conjunction with appropriate electronic equipment, renders it possible to present visual material to a subject for predetermined intervals of time at various levels of illumination. The additional apparatus utilized in the experiments carried out has been generally described heretofore and was all used in order to establish the fact that a subconscious level of awareness exists and can be utilized at the conscious level of awareness.

By the novel method and apparatus of this invention, visual and auditory stimulation in individuals at levels of awareness below that ability of said individuals to report the stimulus verbally can be produced, thereby inducing selective perception resulting in selective overt response. The procedures and apparatus for achieving such subliminal stimulation are necessarily complex in view of the various positive and negative factors interacting simultaneously. However, it has been shown that when these factors are controlled, as disclosed heretofore, significant results are achieved.

These results are applicable to many fields of endeavor. The use of motion picture techniques have obvious commercial, educational and medical applications. Perhaps, one of the most important applications is concerned with propaganda techniques. Wherever this invention is utilized, it offers untold opportunity to effectively influence behavior without the knowledge of the individual being influenced, thereby producing selective persuasive behavior without a person's conscious knowledge. It is also of great importance in analyzing the feelings of an individual by determining the effect of the subliminally presented material on the receptivity of the supraliminal material.

This application is a continuation-in-part of application Serial No. 590,868, filed June 12, 1956, now abandoned, which is a continuation-in-part of an earlier application Serial No. 516,317, filed May 25, 1955, now abandoned.

The novel principles of this invention are broader than the specific embodiments recited above, and rather than unduly extend this disclosure by attempting to list all the numerous modifications which have been conceived and reduced to practice during the course of this development, these novel features are covered in the following claims.

What is claimed is:

1. Apparatus for imparting information to an observer by subconscious visual stimulation comprising a primary motion picture projector for projecting a subliminal image of said information before said observer so as to be recognizable to said observer only at a subconscious level of recognition at the time of such projection, a secondary motion picture projector synchronized with said primary projector for projecting a supraliminal image recognizable to said observer at a conscious level of recognition, a motion picture screen for presenting both the subliminal and supraliminal images, and means for causing at least at predetermined times substantially all parts of the subliminal image as then presented to be modified in intensity in accordance with the intensity of the corresponding parts of the then presented supraliminal image and for causing the supraliminal image as presented to be modified subliminally by the modified subliminal image for assuring substantially full but effective subliminal presentation of such parts of the subliminal images so modified regardless of the intensity of the corresponding parts of the respective supraliminal images, including a first endless film loop having the subliminal image thereon and disposed in said primary projector for recurrent presentation of said subliminal image on said screen, and a second endless film loop having spaced clear and opaque frames thereon and disposed in conjunction with said first endless loop in said primary projector to control repetition rate of presentation of said subliminal image.

2. Apparatus as claimed in claim 1 including a supraliminal image film and a third endless film loop having spaced frames of varying opacity thereon and disposed in conjunction with the said supraliminal film in said secondary projector to control the light intensity of said supraliminal image presented by said supraliminal image film.

3. Apparatus as claimed in claim 1 including a third endless film loop having spaced frames of varying opacity thereon and disposed in conjunction with said first and second endless loops to control the light intensity of said subliminal image.

References Cited in the file of this patent

UNITED STATES PATENTS

| | | |
|---|---|---|
| 1,843,981 | Jobst | Feb. 9, 1932 |
| 2,357,624 | Amdur | Sept. 5, 1944 |

FOREIGN PATENTS

| | | |
|---|---|---|
| 350,008 | France | June 22, 1905 |
| 385,987 | Germany | Dec. 18, 1923 |
| 578,363 | Germany | June 13, 1933 |
| 524,579 | Great Britain | Aug. 9, 1940 |

OTHER REFERENCES

Advertising and Selling, H. L. Hollingworth, pages 228, 229, book published by Appleton, New York, in 1920.

"Perception of Subliminal Visual Stimuli," A. C. Williams, article in Journal of Phsychology, vol. 6, pages 187–199, July-October 1938.

UNITED STATES PATENT OFFICE
Certificate

Patent No. 3,060,795 Issued October 30, 1962

Robert E. Corrigan and Hal C. Becker

Application having been made jointly by Robert E. Corrigan and Hal C. Becker, the inventors named in the patent above identified, and Precon Process and Equipment Corporation, New Orleans, Louisiana, a corporation of Louisiana, the assignee, for the issuance of a certificate under the provisions of Title 35, Section 256 of the United States Code, deleting the name of the said Robert E. Corrigan from the patent as a joint inventor, and a showing and proof of facts satisfying the requirements of the said section having been submitted, it is this 9th day of June 1964, certified that the name of the said Robert E. Corrigan is hereby deleted from the said patent as a joint inventor with the said Hal C. Becker.

[SEAL]

EDWIN L. REYNOLDS,
*First Assistant Commissioner of Patents.*